US010862593B2

(12) United States Patent
Hosokawa et al.

(10) Patent No.: US 10,862,593 B2
(45) Date of Patent: Dec. 8, 2020

(54) FREE-SPACE OPTICAL COMMUNICATION RECEIVING DEVICE AND METHOD OF CONTROLLING THE SAME

(71) Applicant: NEC Corporation, Tokyo (JP)

(72) Inventors: Kohei Hosokawa, Tokyo (JP); Toshiharu Ito, Tokyo (JP); Seigo Takahashi, Tokyo (JP); Manabu Arikawa, Tokyo (JP); Takashi Ishikawa, Tokyo (JP); Yoshimasa Ono, Tokyo (JP)

(73) Assignee: NEC CORPORATION, Tokyo (JP)

(*) Notice: Subject to any disclaimer, the term of this patent is extended or adjusted under 35 U.S.C. 154(b) by 261 days.

(21) Appl. No.: 16/088,328

(22) PCT Filed: Mar. 17, 2017

(86) PCT No.: PCT/JP2017/011004
§ 371 (c)(1),
(2) Date: Sep. 25, 2018

(87) PCT Pub. No.: WO2017/169927
PCT Pub. Date: Oct. 5, 2017

(65) Prior Publication Data
US 2020/0304213 A1 Sep. 24, 2020

(30) Foreign Application Priority Data
Mar. 29, 2016 (JP) ................... 2016-65878

(51) Int. Cl.
H04B 10/69 (2013.01)
H04J 14/04 (2006.01)
(Continued)

(52) U.S. Cl.
CPC .......... H04B 10/697 (2013.01); H04B 10/11 (2013.01); H04B 17/336 (2015.01)

(58) Field of Classification Search
CPC .................. H04B 10/11; H04B 10/697
See application file for complete search history.

(56) References Cited

U.S. PATENT DOCUMENTS

2014/0126902 A1* 5/2014 Swanson ............. H04J 14/04 398/43
2014/0209798 A1* 7/2014 Woodward ........... G02B 6/04 250/227.28
2015/0349888 A1* 12/2015 Chen .............. H04B 10/1121 398/130

FOREIGN PATENT DOCUMENTS

WO 2015/136572 A1 9/2015
WO 2016/013188 A1 1/2016

OTHER PUBLICATIONS

Bryan S. Robinson et al., "781 Mbit/s photon-counting optical communications using a superconducting nanowire detector", Optics Letters, Feb. 15, 2006, pp. 444-446, vol. 31, No. 4.
(Continued)

Primary Examiner — Shi K Li
(74) Attorney, Agent, or Firm — Sughrue Mion, PLLC

(57) ABSTRACT

The objective of the present invention is to reduce the size of a receiving device circuit in an optical space communication system while maintaining communication stability. A data receiving device which decodes one item of data from a plurality of input signals includes: two or more digital signal processing means for subjecting the plurality of input signals to signal processing; a first recording means for temporarily recording the plurality of input signals; a SN ratio estimating means for estimating S/N ratios of each of the plurality of input signals and determining the number of the plurality of input signals to be combined, and the signals to be combined; and a scheduling means for carrying out overall control on the basis of the results from the SN ratio estimating means.

20 Claims, 14 Drawing Sheets

(51) Int. Cl.
*H04B 17/336* (2015.01)
*H04B 10/11* (2013.01)

(56) References Cited

OTHER PUBLICATIONS

Senichi Suzuki, et al., "R & D on the Digital Coherent Signal Processing Technology for Large-capacity Optical Communication Networks", The Journal of the Institute of Electronics, Information and Communication Engineers, 2012, pp. 1100-1116, vol. 95, No. 12.
International Search Report for PCT/JP2017/011004 dated Jun. 6, 2017 [PCT/ISA/210].

* cited by examiner

Fig. 5

| TIME | 1 | 2 | 3 | 4 | 5 | 6 | 7 | 8 |
|---|---|---|---|---|---|---|---|---|
| NUMBER OF SIGNALS REQUIRED FOR COMBINING | 4 | 2 | 8 | 1 | 5 | 1 | 1 | 1 |
| DIGITAL SIGNAL PROCESSING MEANS 203.1 | 1_1 | 2_1 | 3_1 | 3_5 | 4_1 | 5_4 | 7_1 | 8_1 |
| DIGITAL SIGNAL PROCESSING MEANS 203.2 | 1_2 | 2_2 | 3_2 | 3_6 | 5_1 | 5_5 | | |
| DIGITAL SIGNAL PROCESSING MEANS 203.3 | 1_3 | | 3_3 | 3_7 | 5_2 | 6_1 | | |
| DIGITAL SIGNAL PROCESSING MEANS 203.4 | 1_4 | | 3_4 | 3_8 | 5_3 | | | |
| DATA IN FIRST RECORDING MEANS 202 | | | 3_5<br>3_6<br>3_7<br>3_8 | 4_1 | 5_4<br>5_5 | | | |
| DATA IN SECOND RECORDING MEANS 205 | | 1_1<br>1_2<br>1_3<br>1_4 | 1_1<br>1_2<br>1_3<br>1_4<br>2_1<br>2_2 | 2_1<br>2_2<br>3_1<br>3_2<br>3_3<br>3_4 | 3_1<br>3_2<br>3_3<br>3_4<br>3_5<br>3_6<br>3_7<br>3_8 | 4_1<br>5_1<br>5_2<br>5_3 | 5_1<br>5_2<br>5_3<br>5_4<br>5_5<br>6_1<br>6_2 | 6_1<br>6_2 |
| OUTPUT FROM COMBINING MEANS 206 | | | | 1 | 2 | 3 | 4 | 5 |

FREE-SPACE OPTICAL COMMUNICATION RECEIVING DEVICE AND METHOD OF CONTROLLING THE SAME

CROSS REFERENCE TO RELATED APPLICATIONS

This application is a National Stage of International Application No. PCT/JP2017/011004, filed on Mar. 17, 2017, which claims priority from Japanese Patent Application No. 2016-065878, filed on Mar. 29, 2016, the disclosures of which are incorporated herein in their entirety by reference.

TECHNICAL FIELD

The present invention relates to a receiving device for free-space optical communication (FSO) and a method of controlling the same, and particularly relates to a receiving device that performs decoding processing by combining a plurality of received signals.

BACKGROUND ART

Recent years, associated with an improvement in performance of sensors and the like mounted on airplanes and satellites, an expansion in transmission capacity from these moving objects to the ground is required. In order to respond to an expected request for a further increase in transmission capacity in the future, free-space optical communication (FSO) systems that are capable of increasing transmission capacity to a far greater extent than conventional wireless communication systems, which use microwaves, are used.

However, currently used free-space optical communication systems use intensity modulation/direct detection, which associates "1" and "0" in a digital signal with ON and OFF of light, respectively, as it is and detects light intensity of the light signal by use of a light receiving element, and pulse-position modulation as described in Non-Patent Literature 1 (NPL1). For this reason, a further increase in transmission capacity beyond the current level is difficult to achieve.

Therefore, application of digital coherent technology (Non-Patent Literature 2 (NPL2)), which is used in optical fiber communication systems, to free-space optical communication systems is required. However, light is influenced by the atmosphere (generally referred to as atmosphere fluctuation), and, in particular, when received light is coupled to a single-mode fiber, which is used in the digital coherent technology, this characteristic of light becomes a significant issue because the core diameter of a fiber is small.

In order to solve the issue, Patent Literature 1 (PTL1) proposes a method of avoiding deterioration in fiber coupling efficiency by using a multimode fiber, which has a larger core diameter than a single-mode fiber.

FIG. 14 is a block diagram illustrating an expected overall image of a receiving device for free-space optical communication (FSO) when the receiving device is configured by applying a method proposed in PTL1. The receiving device in FIG. 14 includes an optical lens 10, a multimode fiber 20, a Mode Demux 30, single-mode fibers 40$s$ each of which propagates an optical signal 40 in an eigenmode, and 90 degree hybrid units 50. The receiving device for free-space optical communication in FIG. 14 also includes Trans-Impedance Converting Amplifiers (TIA) 60, Analog to Digital Converters (ADC) 70, a Digital Signal Processing unit (DSP) 80, a Local Oscillator (LO) 90, and the like.

In the receiving device for free-space optical communication in FIG. 14, a method is employed in which, after received light has been coupled to the multimode fiber 20 through the optical lens 10 and demultiplexed into respective eigenmodes by the Mode Demux 30, respective signals are processed by the digital signal processing unit 80 and combined. The plurality of optical signals 40 are combined and decoded by the digital signal processing unit 80 into an output signal 80$s$, which is output from the digital signal processing unit 80.

CITATION LIST

Patent Literature

[PTL1] WO2015/136572

Non Patent Literature

[NPL1] Bryan S. Robinson, "781 Mbit/s photon-counting optical communications using a superconducting nanowire detector", OPTICS LETTERS, Vol. 31, No. 4, pp. 444-446, 2006.
[NPL2] Suzuki et al., "R & D on the digital coherent signal processing technology for large-capacity optical communication networks", The journal of the Institute of Electronics, Information and Communication Engineers, Vol. 95, No. 12, pp. 1100-1116, 2012.

SUMMARY OF INVENTION

Technical Problem

In a free-space optical communication system described in PTL1, since use of an appropriate receiving telescope size causes probability distributions of intensities of light in respective eigenmodes to be substantially the same distribution, increasing the number of eigenmodes to be received enables a bit error rate to be reduced.

However, in a free-space optical communication system in which a plurality of rays of light received by telescopes or eigenmodes are received and combined into a signal, there is an issue in that circuit size of a digital signal processing means, which processes respective rays of received light or eigenmodes, is likely to increase in proportion to the number of received rays of light or eigenmodes to be processed. The digital signal processing unit 80 in FIG. 14 also has an issue in that circuit size thereof is likely to increase in proportion to the number of eigenmodes to be processed because, instead of processing at a portion where a plurality of signals are combined, processing of respective eigenmodes occupies most of a processing load.

More specifically, when one Field Programmable Gate Array (FPGA) is required for processing one eigenmode, for a free-space optical communication system using a 21-mode multimode fiber, 21 FPGAs are required. In other words, in the case of the free-space optical communication system using a 21-mode multimode fiber, although the free-space optical communication system described in PTL1 is capable of stabilizing communication, there is an issue in that size and cost thereof increase by at least 21-fold.

An object of the present invention is to provide a receiving device for free-space optical communication and a method of controlling the same that, while maintaining communication stability, reduce circuit size of a receiving device in a free-space optical communication system.

Solution to Problem

To achieve the above-mentioned object, a data receiving device according to the present invention, that decodes one stream of data from a plurality of input signals, the data receiving device including:

at least two or more digital signal processing means for performing signal processing on the plurality of input signals;

a first recording means for recording the plurality of input signals temporarily;

a switch means for supplying the digital signal processing means with the plurality of input signals or a value recorded in the first recording means;

an SN ratio estimating means for estimating an S/N ratio of each of the plurality of input signals and determining the number of the input signals to be combined and a signal to be combined;

a second recording means for recording a set of values output from each of the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way as to cause, when the number of the input signals recorded in the first recording means is greater than or equal to the number of the digital signal processing means, the digital signal processing means to perform processing of the input signals in the order of time at which the input signals were recorded in the first recording means and, out of the input signals at the time of the processing, a signal that the SN ratio estimating means determines to combine to be recorded in the first recording means, and, when the number of the input signals recorded in the first recording means is less than the number of the digital signal processing means, the digital signal processing means to process a signal recorded in the first recording means and the input signal and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine to be recorded in the first recording means.

A control method of a data receiving device according to the present invention, that decodes one stream of data from a plurality of input signals, the data receiving device including:

a first recording means for recording a plurality of input signals temporarily;

an SN ratio estimating means for estimating an S/N ratio of each of the plurality of input signals and determining the number of the input signals to be combined and a signal to be combined at least two or more digital signal processing means for performing signal processing on the plurality of input signals;

a switch means for supplying the digital signal processing means with the plurality of input signals or a value recorded in the first recording means;

a second recording means for recording data output from the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal that the SN ratio estimating means determines to combine is recorded in the first recording means, and, when the number of the input signals recorded in the first recording means is less than the number of the digital signal processing means, the digital signal processing means process a signal recorded in the first recording means and the input signal, and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine is recorded in the first recording means.

A control program of a data receiving device according to the present invention, that decodes one stream of data from a plurality of input signals, the control program making a computer function as:

at least two or more digital signal processing means for performing signal processing on the plurality of input signals;

a first recording means for recording the plurality of input signals temporarily;

a switch means for supplying the digital signal processing means with the plurality of input signals or a value recorded in the first recording means;

an SN ratio estimating means for estimating an S/N ratio of each of the plurality of input signals and determining the number of the input signals to be combined and a signal to be combined;

a second recording means for recording a set of values output from each of the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal that the SN ratio estimating means determines to combine is recorded in the first recording means, and, when the number of the input signals recorded in the first recording means is less than the number of the digital signal processing means, the digital signal processing means process a signal recorded in the first recording means and the input signal, and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine is recorded in the first recording means.

Advantageous Effect of Invention

According to the present invention, it becomes possible to reduce circuit size of a receiving device, while maintaining communication stability in a free-space optical communication system.

BRIEF DESCRIPTION OF DRAWINGS

FIG. 5 is a diagram for a description of an operation of the receiving device of the first example embodiment.

EXAMPLE EMBODIMENT

Figure 1:
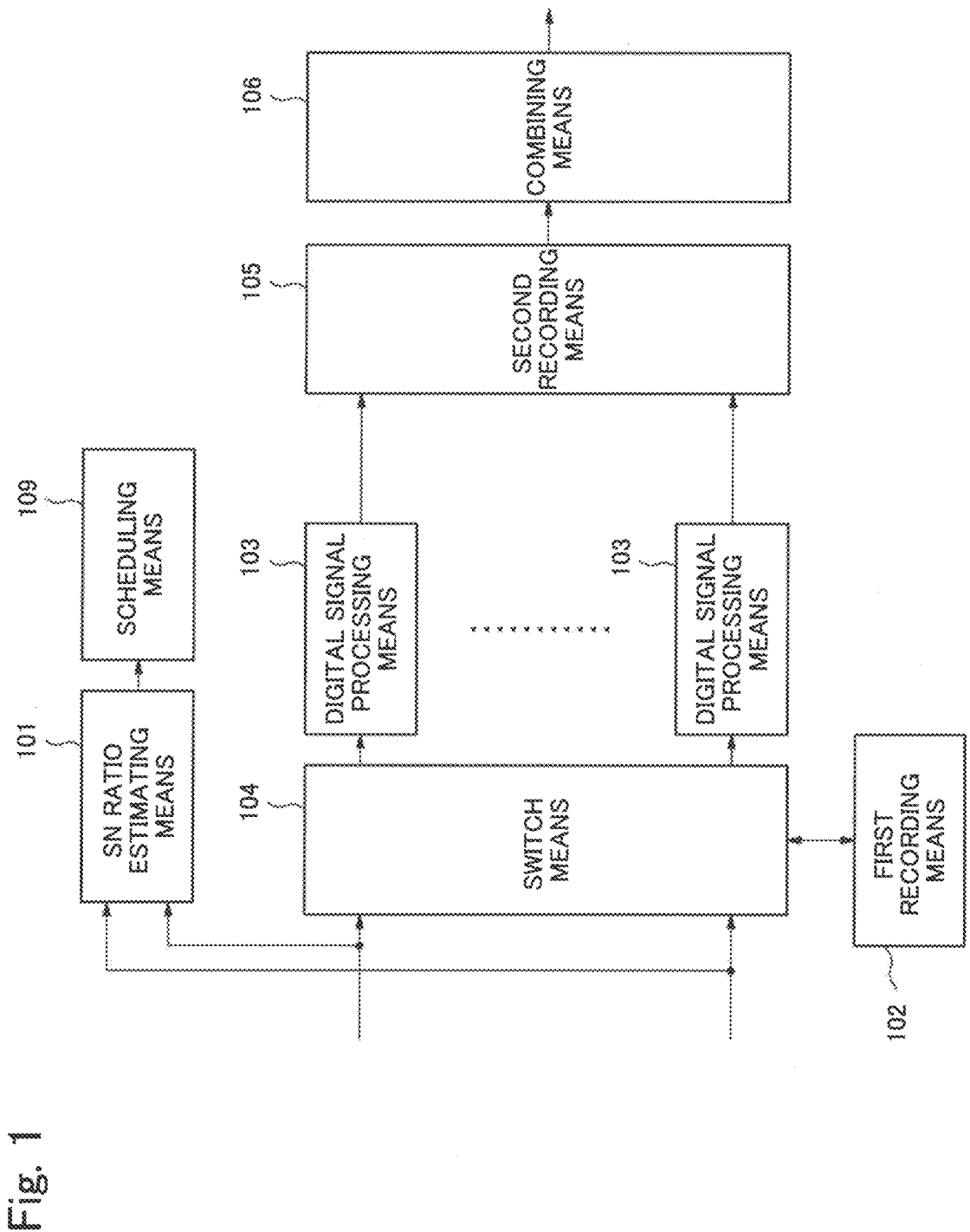
FIG. 1 is a block diagram illustrating a receiving device according to an example embodiment of the broadest concept.

To give an overview of a receiving device of the present invention, the receiving device of the present invention is a data receiving device that decodes one stream of data from a plurality of input signals. The receiving device of the present invention includes an SN ratio estimating means for estimating an S/N ratio of each of the plurality of input signals and a memory into which values of the respective signals are saved temporarily. The receiving device of the present invention operates in such a way that, when the number of signals recorded in the memory is greater than the number of digital signal processing means, the digital signal processing means perform processing of the signals in the order of time at which the signals were recorded in the memory and an input signal(s) at the time of the processing is/are recorded in the memory. In the receiving device of the present invention, when the number of signals recorded in the memory is less than the number of the digital signal processing means, the digital signal processing means process a signal(s) recorded in the memory and an input signal(s). When the number of signals to be processed by the digital signal processing means is less than the number of signals to be combined that is determined by the SN ratio estimating means, the receiving device of the present invention operates in such a way as to record only a signal(s) that is/are to be required out of an input signal(s).

Before describing preferred example embodiments of the present invention, a receiving device according to an example embodiment of the broadest concept of the present invention will be described in detail with reference to the drawings. Note that directions of arrows in the drawings are only an example and do not limit directions of signals between blocks.

A receiving device in FIG. 1 is a receiving device for free-space optical communication (FSO). The receiving device in FIG. 1 includes an SN ratio estimating means 101, a first recording means 102, a plurality of digital signal processing means 103, a switch means 104, a second recording means 105, a combining means 106, and a scheduling means 109.

The SN ratio estimating means 101 estimates a Signal to Noise ratio (S/N ratio) of each of a plurality of input digital signals. The first recording means 102 records values of a digital signal(s) temporarily based on a determination by the scheduling means 109.

The plurality of digital signal processing means 103 are blocks where digital signal processing is performed and remove distortion and the like in respective digital signals so that symbol detection can be performed.

The switch means 104 selects as many sets of data as the number of the digital signal processing means 103 out of the above-described plurality of input digital signals or data recorded in the first recording means 102, and hands over the selected sets of data to the digital signal processing means 103. The switch means 104 performs the above processing in accordance with instructions from the scheduling means 109.

The second recording means 105 is a means for recording results of processing performed by the digital signal processing means 103. The second recording means 105 records data output from the digital signal processing means 103 temporarily.

The combining means 106, when all sets of data constituting the entire data in each frame (which will be described later) are recorded in the second recording means 105, performs combining processing with respect to the frame and generates decoded data.

The scheduling means 109 controls the whole receiving device, based on S/N ratios of respective data signals estimated by the SN ratio estimating means 101. The scheduling means 109 performs control of the various types of means described above at a certain time interval.

Advantageous Effects of Present Example Embodiment

The receiving device in FIG. 1 enables the number of the digital signal processing means 103 to be reduced.

This is because different control is performed between a case where the number of input signals recorded in the first recording means 102 is greater than or equal to the number of the digital signal processing means 103 and a case where the number of the input signals recorded in the first recording means 102 is less than the number of the digital signal processing means 103 and the control is optimized in each case.

Specifically, when the number of input signals recorded in the first recording means 102 is greater than or equal to the number of the digital signal processing means 103, the digital signal processing means 103 perform processing of the input signals in the order of time at which the input signals were recorded in the first recording means 102. Further, out of input signals at the time of the processing, a signal(s) that the SN ratio estimating means 101 determines to combine is/are recorded in the first recording means 102.

When the number of input signals recorded in the first recording means 102 is less than the number of the digital signal processing means 103, the digital signal processing means 103 process the signal(s) recorded in the first recording means 102 and an input signal(s). When the number of input signals to be processed by the digital signal processing means 103 is less than the number of signals to be combined that is determined by the SN ratio estimating means 101, only a signal(s) that is/are not processed by the digital signal processing means 103 out of a signal(s) that the SN ratio estimating means 101 determines to combine is/are recorded in the first recording means 102.

As a result of a reduction in the number of the digital signal processing means 103, circuit size of the receiving device may be reduced. In addition, the receiving device of the above-described example embodiment, while enabling communication stability to be maintained in a free-space optical communication system, enables circuit size of the whole system to be reduced. Hereinafter, more specific example embodiments of the present invention will be described.

First Example Embodiment

Figure 2:
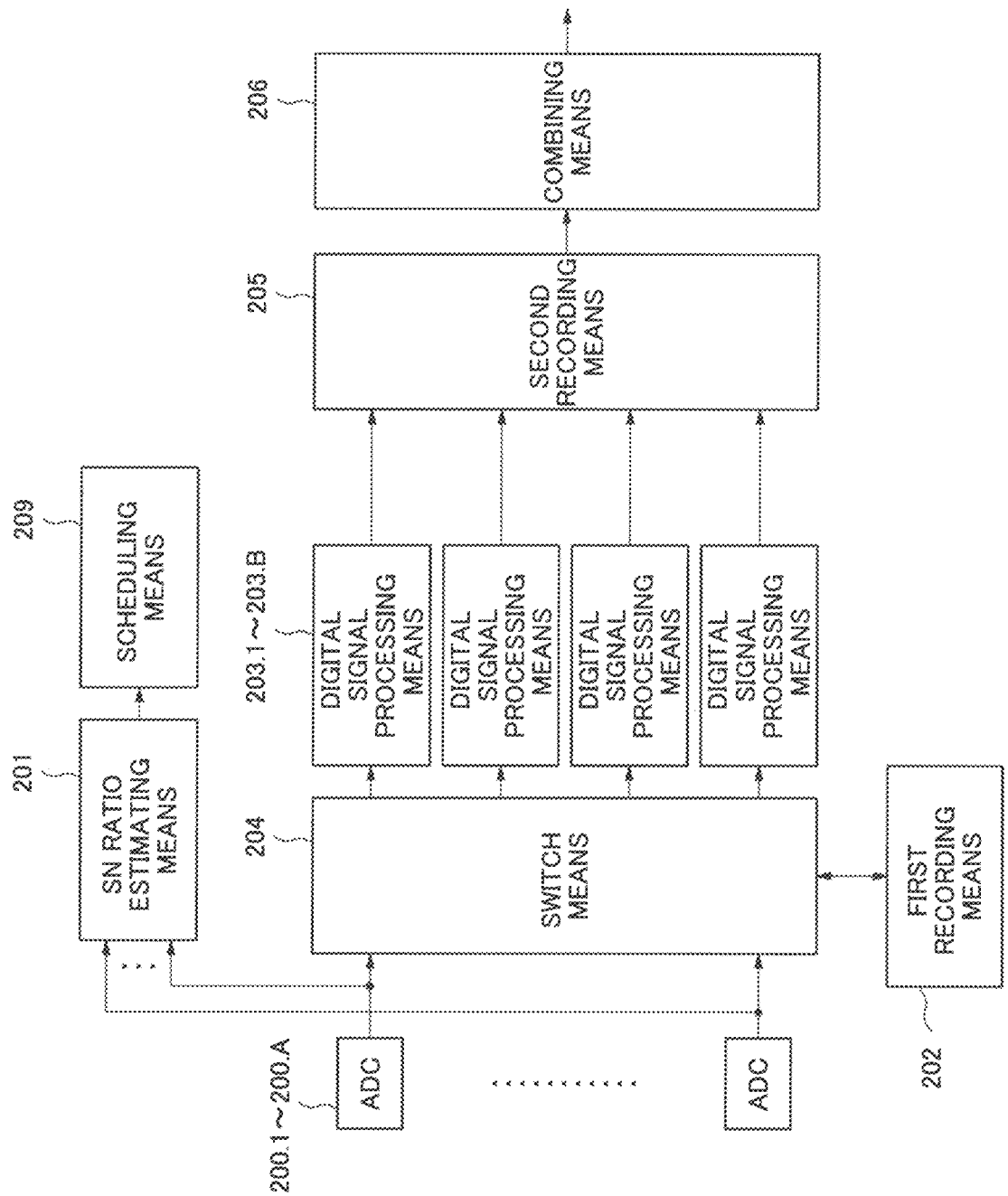
FIG. 2 is a block diagram illustrating a receiving device according to a first example embodiment.
Figure 3:
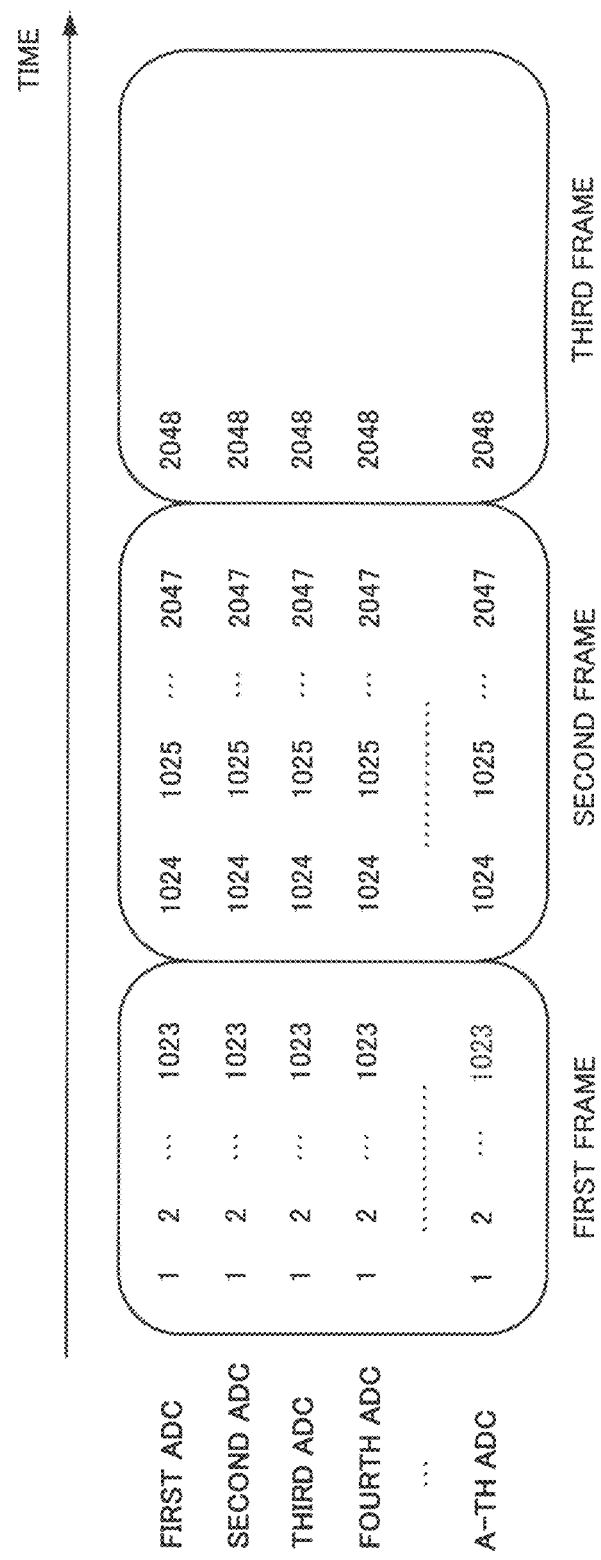
FIG. 3 is a diagram for a description of frames.
Figure 4:
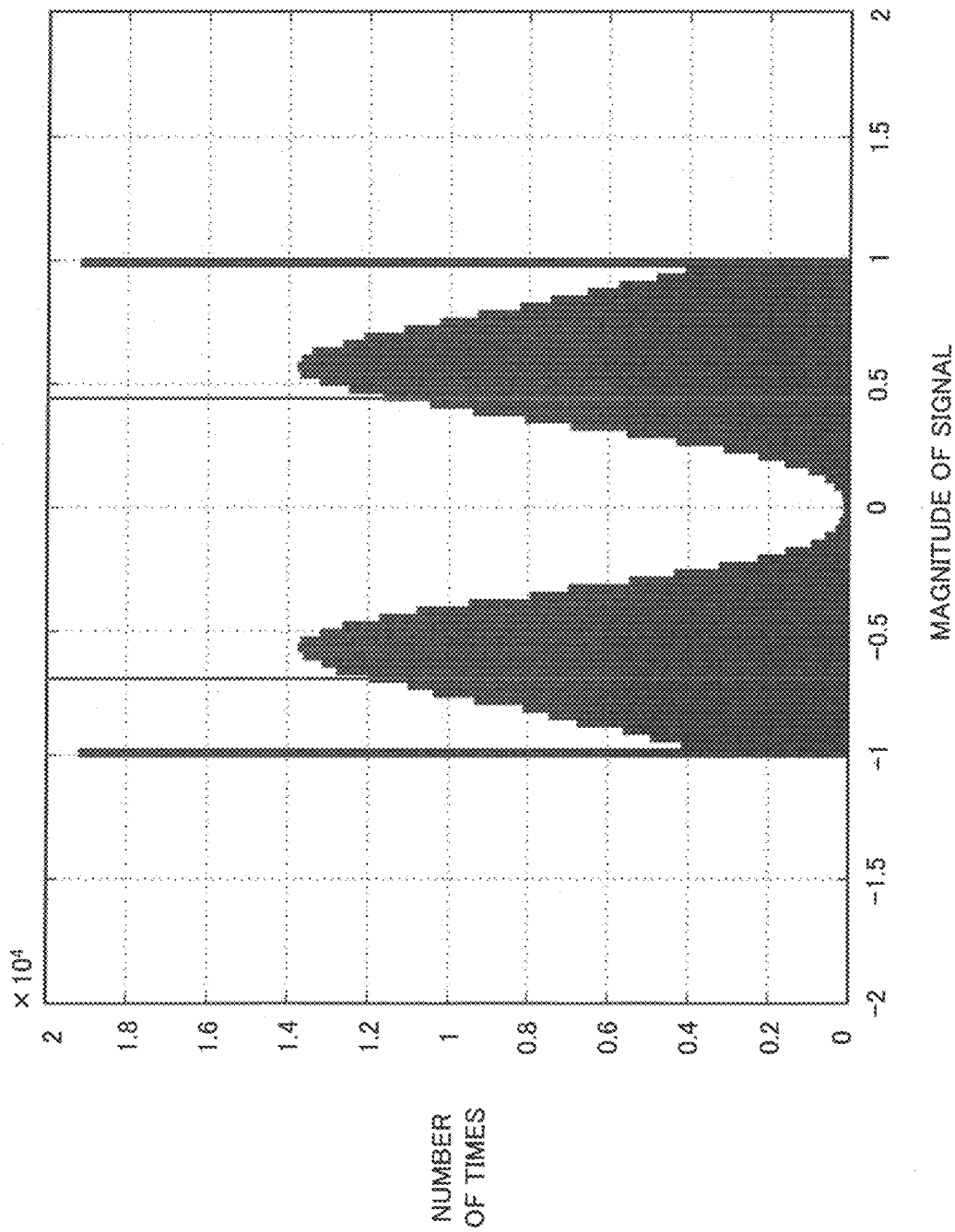
FIG. 4 is a diagram for a description of an example of an operation of an SN ratio estimating means.

Next, a receiving device according to a first example embodiment of the present invention will be described. FIG. 2 is a block diagram illustrating the receiving device according to the first example embodiment. FIG. 3 is a diagram for a description of frames. FIG. 4 is a diagram for a description of an example of an operation of an SN ratio estimating means 201. FIG. 5 is a diagram for a description of an operation of the receiving device of the first example embodiment.

The receiving device in FIG. 2 includes a plurality of ADCs 200, the SN ratio estimating means 201, a first recording means 202, a plurality of digital signal processing means 203, a switch means 204, a second recording means 205, a combining means 206, and a scheduling means 209.

As to the receiving device in FIG. 2, a case where, as an example of the plurality of ADCs 200, ADCs 200.1 to 200.A to which A analog signals are input and that output A digital signals are included is illustrated. Further, as to the receiving device in FIG. 2, a case where, as an example of the plurality of digital signal processing means 203, B digital signal processing means 203.1 to 203.B are included is illustrated.

Operation of Present Example Embodiment

Before describing operations of respective functions, a frame will be described by use of FIG. 3. Each number x in FIG. 3 indicates an output value from an ADC at time x that is output from one of the ADCs 200.1 to 200.A. A frame is a unit by which the scheduling means 209 switches operations, and FIG. 3 illustrates that the switching is performed at every approximately 1024 time points. Hereinafter, a frame is denoted by a symbol F. For example, when signal reception through delay interference is performed at a transmission rate of 2.5 Gbps and a received signal is sampled at a rate of two times per symbol, time required to process one frame (1024 pieces of data) is 204.8 ns. In the case of a free-space optical communication (FSO) system, since it is considered that velocity of fluctuation in light intensity due to atmosphere fluctuation is approximately several kHz, designing the size of a frame to be shorter than the velocity of fluctuation enables the system to be designed assuming that no fluctuation in light intensity due to atmosphere fluctuation occurs within the same frame.

Next, operations of respective functions will be described in more detail.

The ADCs 200.1 to 200.A generates A digital signals from A analog signals. In other words, a modulation method employed by the ADCs is limited to a method that generates a digital signal from an analog signal, and examples of such a modulation method include, for example, binary phase shift keying (BPS K) that uses signal reception through delay interference.

The SN ratio estimating means 201, based on A digital signals output from the ADCs 200.1 to 200.A, estimates an S/N ratio of each digital signal. For example, an S/N ratio is estimated for each frame by use of a histogram as illustrated in FIG. 4. In the case of FIG. 4, it may be assumed that a signal is represented by the peaks of respective symbols and noise is represented by differences between respective symbol positions and positions of the signal. In addition, other methods for estimating an S/N ratio include a method of estimating an S/N ratio by use of a clipping ratio (a ratio of output values from an ADC that are a minimum value or a maximum value) of an ADC.

The first recording means 202 records the above-described digital signals, based on a determination by the scheduling means 209. Capacity required for the first recording means 202 is determined from the number of the digital signal processing means 203.1 to 203.B, probability distribution of the number of signals to be combined required for establishing communication, and probability that a state in which processing cannot be continued due to capacity shortage of the first recording means 202 is acceptable. The capacity required for the first recording means 202 may be calculated by use of, for example, queueing theory. Meanwhile, throughput (bandwidth, the amount of data per second that can be transferred) from the switch means 204 to the first recording means 202 is at least calculated as "a sampling rate of an ADC multiplied by resolution of an ADC multiplied by A". Throughput from the first recording means 202 to the switch means 204, which is reverse to the above throughput, is calculated as "a sampling rate of an ADC multiplied by resolution of an ADC multiplied by B".

The digital signal processing means 203.1 to 203.B are B blocks where digital signal processing is performed and remove distortion and the like in respective digital signals so that symbol detection can be performed. Obviously, A>B holds. The respective digital signal processing means 203.1 to 203.B process data from the ADCs 200.1 to 200.A and/or data recorded in the first recording means 202 in units of a frame and compensate for distortion and the like occurring in communication channels and transmitters and receivers.

The switch means 204 selects as many sets of data as the number of the digital signal processing means 203.1 to 203.B out of data from the ADCs 200.1 to 200.A and/or data recorded in the first recording means 202, and hands over the selected sets of data to the digital signal processing means 203.1 to 203.B. In other words, the switch means 204 hands over sets of data out of data from the ADCs 200.1 to 200.A and/or data recorded in the first recording means 202 to the digital signal processing means 203.1 to 203.B in accordance with an instruction from the scheduling means 209. In addition, performing an operation of, out of data simultaneously output from the ADCs 200.1 to 200.A, without handing over a set(s) of data to the first recording means 202 nor to the digital signal processing means 203.1 to 203.B, discarding the set(s) of data is also a function of the switch means 204.

The second recording means 205 is a means for recording results of processing performed by the digital signal processing means 203.1 to 203.B. The second recording means 205 records data output from the digital signal processing means 203.1 to 203.B temporarily.

The combining means 206 is a means for, when all sets of data constituting the entire data in each frame are recorded in the second recording means 205, performing combining processing with respect to the frame and generating decoded data. A combining method used by the combining means 206 may be maximum ratio combining or equal ratio combining.

The scheduling means 209 controls the whole receiving device, based on S/N ratios of respective data signals estimated by the SN ratio estimating means 201. The scheduling means 209 performs control of the various types of means described above at a certain time interval. Hereinafter, it is assumed that the time interval is referred to as a frame.

Next, a detailed flow of operation of the present example embodiment will be described by use of an example in FIG. 5. On this occasion, although a case where the number A, which represents the number of input signals, is 8 or more (the following description will be made assuming A to be 8) and the number B, which represents the number of the digital signal processing means 203.1 to 203.B, is 4 will be described, the number of input signals (A) and the number of the digital signal processing means 203 (B) are not limited to these numbers.

FIG. 5 illustrates a case where the SN ratio estimating means 201 determines to combine four signals, two signals, eight signals, one signal, five signals, one signal, one signal, and one signal at time 1, time 2, time 3, time 4, time 5, time 6, time 7, and time 8, respectively. Each of symbols X_Y in the rows corresponding to the respective digital signal processing means 203.1 to 203.4 means that a corresponding one of the digital signal processing means 203.1 to 203.4 processes a signal having a Y-th highest S/N ratio of the sets of data given at time X. That is, the symbols X_Y mean, for example, that, at time 1, the digital signal processing means 203.1 and the digital signal processing means 203.2 process a signal having a highest S/N ratio and a signal having a second highest S/N ratio of the sets of data given at time 1, respectively.

At time 1, the respective digital signal processing means 203.1 to 203.4 process sets of data given at time 1 in descending order of S/N ratio. The switch means 204 operates in such a way as to input four sets of data having high S/N ratios out of data output from the ADCs 200.1 to 200.8 to the digital signal processing means 203.1 to 203.4 and discard the other four sets of data. Signals processed by the digital signal processing means 203.1 to 203.4 are recorded in the second recording means 205.

At time 2, the respective digital signal processing means 203.1 to 203.4 process sets of data given at time 2 in descending order of S/N ratio. Since the SN ratio estimating means 201 has determined that it suffices to combine two sets of data, the digital signal processing means 203.1 and 203.2 process two sets of data. At this time, the switch means 204, as with the operation at time 1, operates in such a way as to input two sets of data having high S/N ratios to the digital signal processing means 203.1 and 203.2 and discard the other six sets of data. In this way, processing minimum sets of data required to be processed enables power consumption, storage capacity of the second recording means 205 or the like to be reduced. Note, however, that, when an error rate of communication is required to be reduced, data 2_3 and 2_4 may be scheduled to be supplied to the digital signal processing means 203.3 and 203.4 because the digital signal processing means 203.3 and 203.4 are not used.

At time 3, the respective digital signal processing means 203.1 to 203.4 process sets of data given at time 3 in descending order of S/N ratio. Since, at time 3, the SN ratio estimating means 201 has determined that it is required to combine eight signals, the other four sets of data are recorded in the first recording means 202. Four sets of data having been processed by the digital signal processing means 203.1 to 203.4 are saved in the second recording means 205 temporarily to be subsequently combined with the sets of data recorded in the first recording means 202.

At time 4, since the SN ratio estimating means 201 has determined that it suffices to process a set of data, the switch means 204 operates in such a way that the digital signal processing means 203.1 to 203.4 process data 3_5, 3_6, 3_7, and 3_8 and also operates in such a way as to record data 4_1 inputted (a signal having a highest S/N ratio at time 4) in the first recording means 202 and discard the other input data. The combining means 206 reads data 1_1, 1_2, 1_3, and 1_4 from the second recording means 205, combines the data 1_1, 1_2, 1_3, and 1_4, and outputs decoded data relating to time 1. Although the amount of delay is set at 3 in this example, there is an issue in that, when the amount of delay is too short, there may appear a section where an output data stream from the combining means 206 is interrupted, and, when the amount of delay is extended, although interruption becomes unlikely to occur, capacity required for the second recording means 205 increases. In addition, the data 1_1, 1_2, 1_3, and 1_4, which were used for the combining, are erased from the second recording means 205.

At time 5, since the data 4_1 are recorded in the first recording means 202, the switch means 204 operates in such a way that the data 4_1 are preferentially processed. However, since the other three digital signal processing means 203.2 to 203.4 are left unassigned, the switch means 204 operates in such a way as to supply the digital signal processing means 203.2 to 203.4 with data 5_1, 5_2, and 5_3, record data 5_4 and 5_5 in the first recording means 202, and discard the other data 5_6, 5_7, and 5_8. The combining means 206, following the processing at time 4, reads data 2_1 and 2_2, which are sets of data relating to time 2, from the second recording means 205, combines the data 2_1 and 2_2, and outputs the combined data.

At time 6, since the data 5_4 and 5_5 are recorded in the first recording means 202, the switch means 204 operates in such a way that the data 5_4 and 5_5 are preferentially processed. However, since the other two digital signal processing means 203.3 and 203.4 are left unassigned and the SN ratio estimating means 201 has determined that it suffices to process a set of data, the switch means 204 inputs data 6_1 to the digital signal processing means 203.3. The other digital signal processing means 203.4 may process data 6_2 in order to stabilize communication or halt an operation in order to reduce power consumption and usage capacity of the second recording means 205. The combining means 206, following the processing at time 5, reads data 3_1 to 3_8, which are sets of data relating to time 3, from the second recording means 205, combines the data 3_1 to 3_8, and outputs the combined data.

Advantageous Effects of Present Example Embodiment

The receiving device in FIG. 2 enables the number of the digital signal processing means 203 to be reduced.

This is because different control is performed between a case where the number of input signals recorded in the first recording means 202 is greater than or equal to the number of the digital signal processing means 203 and a case where the number of input signals recorded in the first recording means 202 is less than the number of the digital signal processing means 203 and the control is optimized in each case.

Specifically, when the number of input signals recorded in the first recording means 202 is greater than or equal to the number of the digital signal processing means 203, the digital signal processing means 203 perform processing of the input signals in the order of time at which the input signals were recorded in the first recording means 202. Further, out of input signals at the time of the processing, a signal(s) that the SN ratio estimating means 201 determines to combine is/are recorded in the first recording means 202.

When the number of input signals recorded in the first recording means 202 is less than the number of the digital signal processing means 203, the digital signal processing means 203 process the signal(s) recorded in the first recording means 202 and an input signal(s). When the number of input signals to be processed by the digital signal processing means 203 is less than the number of signals to be combined that is determined by the SN ratio estimating means 201, only a signal(s) that is/are not processed by the digital signal processing means 203 out of a signal(s) that the SN ratio estimating means 201 determines to combine is/are recorded in the first recording means 202.

As a result of a reduction in the number of the digital signal processing means 203, circuit size of the whole system may be reduced.

For example, since, in the present example embodiment, the number A of input signals and the number B of the digital signal processing means 203 are 8 and 4, respectively, 4 (=8-4) digital signal processing means 203 may be reduced.

The operation of the present example embodiment may be fixed in such a way as to combine a maximum number of signals when the SN ratio estimating means 201 determines that signals the number of which is greater than or equal to the number of the digital signal processing means 203 are required to be combined. Such an operation, although causing recording capacity required for the first recording means 202 to increase and the total number of sets of data that the digital signal processing means 203 process to increase, has an advantage in enabling complicated control to be simplified.

The first recording means 202 and the second recording means 205 may be configured with the same recording means. Such a configuration, although causing operation to be complicated, has an advantage in enabling the number of physical devices to be reduced.

When the SN ratio estimating means 201 determines that input signals cannot be decoded even when all the signals are combined, the scheduling means 209 may schedule processing in such a way as to skip processing of the entire frame. Such an operation enables the amount of data processed by the digital signal processing means 203.1 to 203.B to be reduced.

Out of the B digital signal processing means 203, the digital signal processing means 203.1 may be designed to have higher accuracy than the digital signal processing means 203.B. Since the digital signal processing means 203.1 processes a signal having a higher S/N ratio than one processed by the digital signal processing means 203.B and a signal having a higher S/N ratio is more heavily weighted when combined with other signals, such a configuration enables noise after combining to be reduced.

The above-described operation of the present example embodiment indicates a rough flow. Although, in an actual circuit, delay sometimes occurs in the digital signal processing means 203.1 to 203.B and incoincidence between actual processing time and time described in the process flow of the present example embodiment is sometimes caused by introduction of pipelining and the like, such delay and incoincidence do not limit the present invention.

Although, for ease of explanation, the present example embodiment is configured in such a way that an optical signal corresponds to a digital signal, the example embodiments of the present invention are not limited to the configuration. A case where an optical signal contains two digital signals (for example, single-polarization Quadrature Phase Shift Keying (QPSK)) may also be coped with by collectively treating digital signals corresponding to an optical signal. In addition, a case where an optical signal contains four digital signals (for example, dual-polarization QPSK) may also be coped with by collectively treating digital signals corresponding to an optical signal.

Second Example Embodiment

Figure 6:
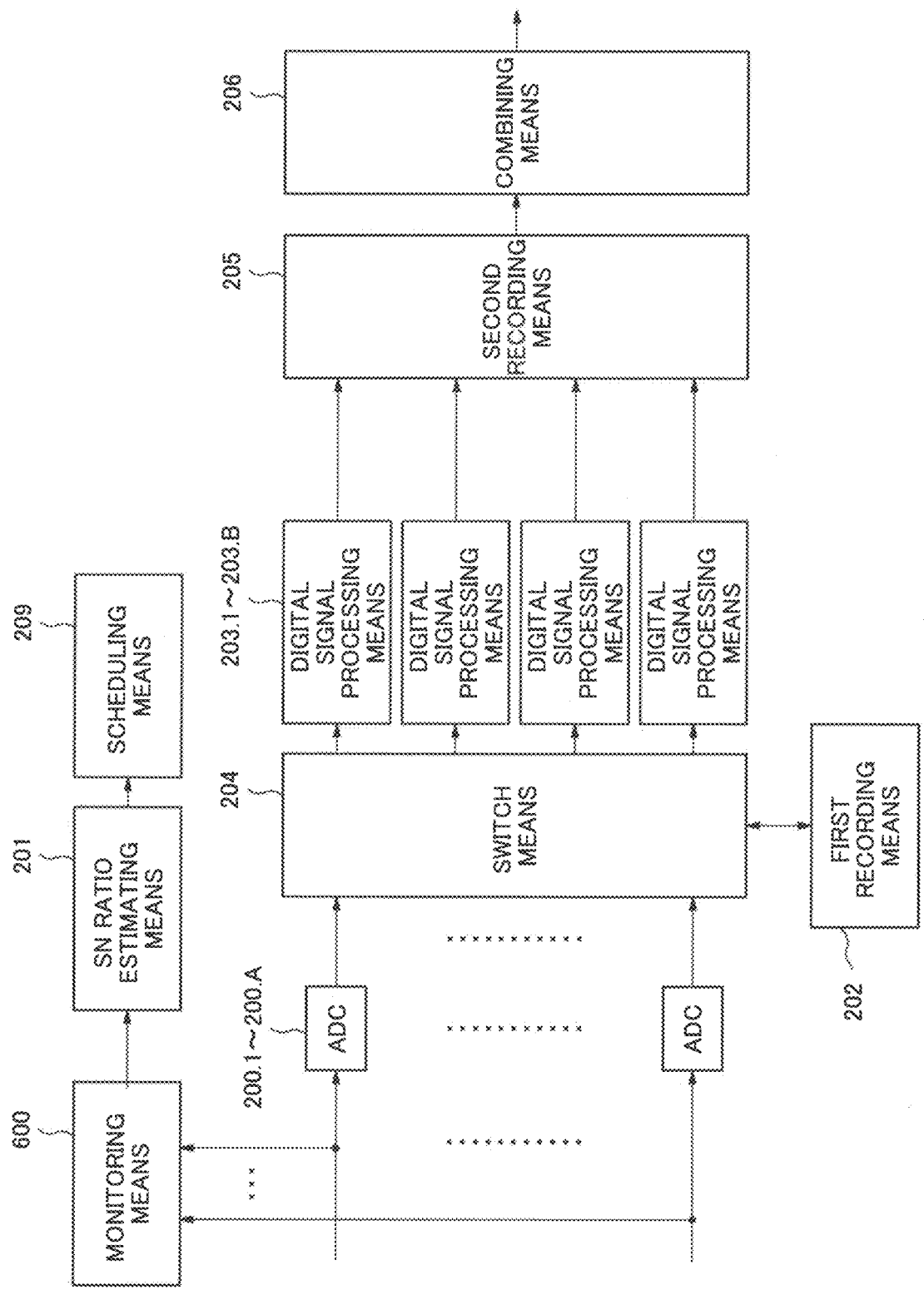
FIG. 6 is a block diagram illustrating a receiving device according to a second example embodiment.

Next, a receiving device according to a second example embodiment of the present invention will be described. The present example embodiment is an example embodiment relating to a method of using an external optical monitor for S/N ratio estimation. FIG. 6 is a block diagram illustrating the receiving device according to the second example embodiment. The same reference numbers are assigned to the same components as those in the receiving device according to the first example embodiment, and a detailed description thereof will be omitted.

The receiving device of the second example embodiment, as with the receiving device of the first example embodiment, includes a plurality of ADCs 200, an SN ratio estimating means 201, a first recording means 202, a plurality of digital signal processing means 203, a switch means 204, and a second recording means 205. The receiving device of the second example embodiment, as with the receiving device of the first example embodiment, also includes a combining means 206 and a scheduling means 209.

As to the receiving device in FIG. 6, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 6, as with the receiving device of the first example embodiment, a case where, as an example of the plurality of digital signal processing means 203, B digital signal processing means 203.1 to 203.B are included is illustrated.

The receiving device of the second example embodiment also includes a monitoring means 600. The monitoring means 600 is, for example, a means placed externally and monitors intensities of received signals before being input to the ADCs 200.1 to 200.A. Although, in the first example embodiment, the SN ratio estimating means 201 estimates an S/N ratio of each of A digital signals output from the ADCs 200.1 to 200.A, the present example embodiment is an embodiment that estimates S/N ratios of respective signals by use of the monitoring means 600, which monitors intensities of received signals before being input to the ADCs 200.1 to 200.A.

The SN ratio estimating means 201 estimates an S/N ratio by use of a characteristic that an S/N ratio depends on received signal intensity (in general, a signal with a weak intensity contains a large amount of noise and a signal with a strong intensity contains a small amount of noise). For example, the SN ratio estimating means 201 measures an S/N ratio for each reception intensity in advance and, by comparing the measured values with a reception intensity acquired by the monitoring means 600, estimates an S/N ratio.

The present example embodiment, as with the above-described first example embodiment, enables the number of the digital signal processing means 203 to be reduced. As a result of a reduction in the number of the digital signal processing means 203, circuit size of the whole system may be reduced.

Further, in the present example embodiment, the monitoring means 600 monitoring intensities of received signals before being input to the ADCs 200.1 to 200.A enables S/N ratios to be estimated more accurately.

Third Example Embodiment

Figure 7:
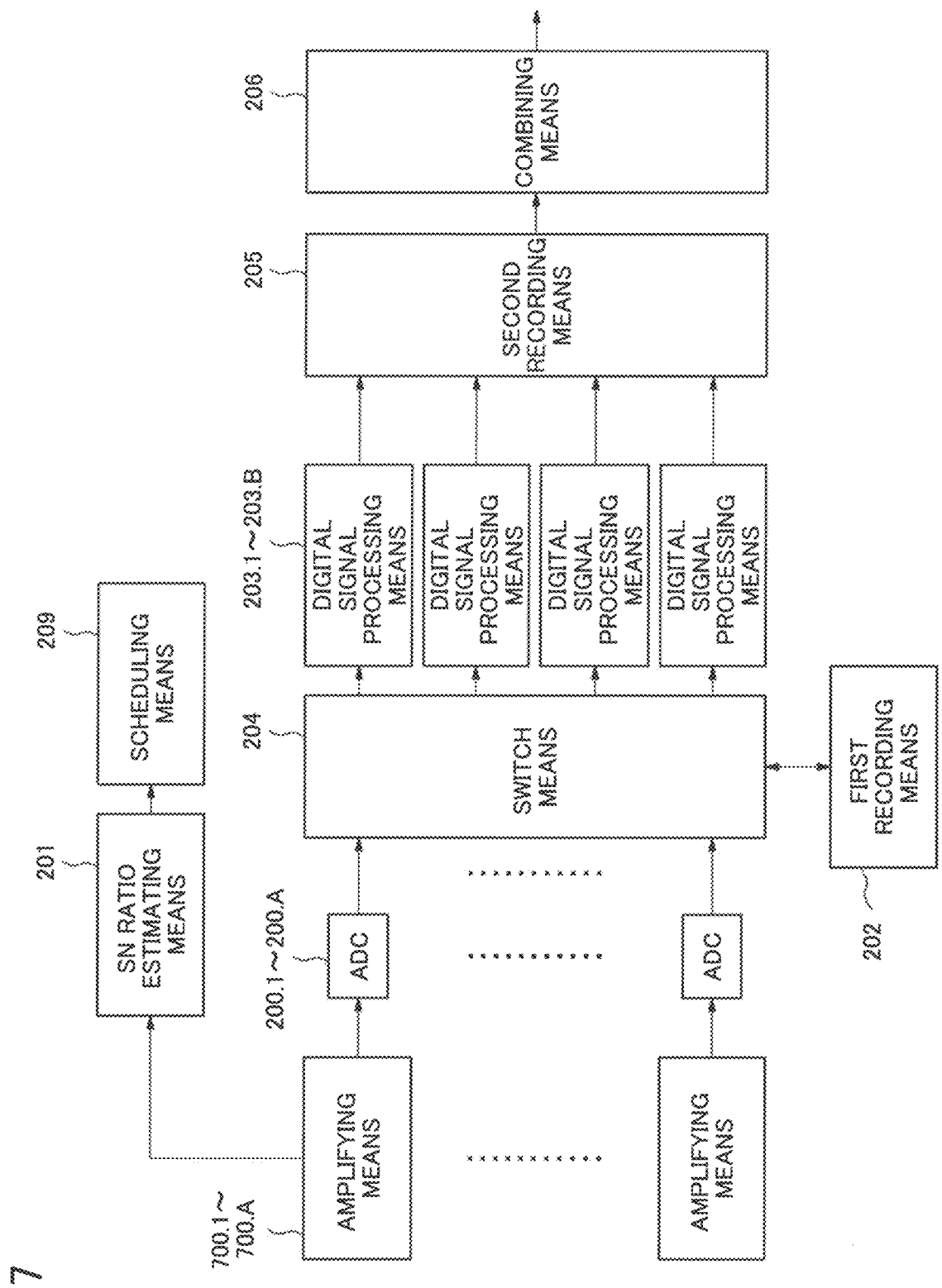
FIG. 7 is a block diagram illustrating a receiving device according to a third example embodiment.

Next, a receiving device according to a third example embodiment of the present invention will be described. The present example embodiment is an example embodiment relating to a method of determining S/N ratios, based on amplification factors of an external amplifying means. FIG. 7 is a block diagram illustrating the receiving device according to the third example embodiment of the present invention. The same reference numbers are assigned to the same components as those in the receiving device according to the first example embodiment, and a detailed description thereof will be omitted.

The receiving device of the third example embodiment, as with the receiving device of the first example embodiment, includes a plurality of ADCs 200, an SN ratio estimating means 201, a first recording means 202, a plurality of digital signal processing means 203, a switch means 204, and a second recording means 205. The receiving device of the third example embodiment, as with the receiving device of the first example embodiment, also includes a combining means 206 and a scheduling means 209.

As to the receiving device in FIG. 7, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 7, as with the receiving device of the first example embodiment, a case where, as an example of the plurality of digital signal processing means 203, B digital signal processing means 203.1 to 203.B are included is illustrated.

The receiving device of the third example embodiment also includes amplifying means 700. The amplifying means 700 are, for example, means placed externally, are electrical or optical amplifiers, and amplify signals in such a way that input power to the ADCs 200 are maintained at a certain level to utilize the performance of the ADCs 200 to the maximum extent possible. In FIG. 7, a case where amplifying means 700.1 to 700.A are placed correspondingly to the ADCs 200.1 to 200.A is illustrated.

In the present example embodiment, instead of determining S/N ratios, based on outputs from the ADCs 200.1 to 200.A as in the first example embodiment, the SN ratio estimating means 201 estimates S/N ratios of respective signals, based on amplification factors of the amplifying means 700.1 to 700.A, which are placed before the ADCs 200.1 to 200.A.

Since, as described in the second example embodiment, in general, a signal with a weak intensity contains a large amount of noise and a signal with a strong intensity contains a small amount of noise, a signal amplified with a high amplification factor contains a large amount of noise and a signal amplified with a low amplification factor contains a small amount of noise. By use of this tendency, the SN ratio estimating means 201, based on the amplification factors of the amplifying means 700.1 to 700.A, determines a signal amplified with a high amplification factor to contain a large amount of noise and a signal amplified with a low amplification factor to contain a small amount of noise. For example, the SN ratio estimating means 201 measures an S/N ratio for each amplification factor in advance and, by comparing the measured values with amplification factors of the amplifying means 700.1 to 700.A, estimates S/N ratios.

The present example embodiment, as with the above-described first example embodiment, enables the number of the digital signal processing means 203 to be reduced. As a result of a reduction in the number of the digital signal processing means 203, circuit size of the whole system may be reduced.

Further, in the present example embodiment, S/N ratios of respective signals are estimated based on amplification factors of the amplifying means 700.1 to 700.A, which amplify signals in such a way that input power to the ADCs 200 are maintained at a certain level in order to utilize the performance of the ADCs 200. Since being not influenced by frequency responses and the like of the ADCs 200.1 to 200.A, S/N ratios may be estimated more accurately than the first example embodiment.

Fourth Example Embodiment

Figure 8:
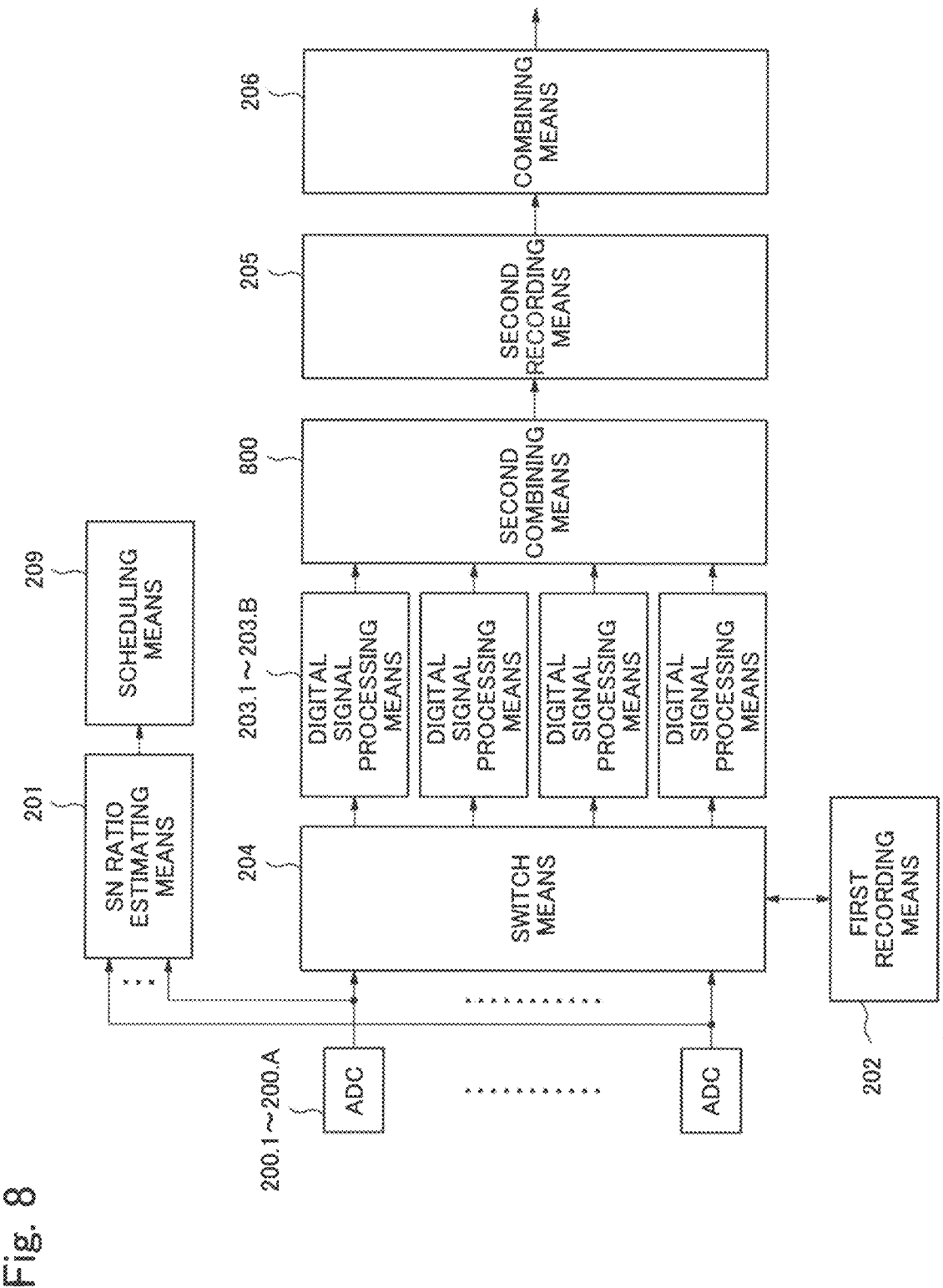
FIG. 8 is a block diagram illustrating a receiving device according to a fourth example embodiment.

Next, a receiving device according to a fourth example embodiment of the present invention will be described. The present example embodiment is an example embodiment characterized by performing recording after performing combining in a simplified manner. FIG. 8 is a block diagram illustrating the receiving device according to the fourth example embodiment of the present invention. The same reference numbers are assigned to the same components as those in the receiving device according to the first example embodiment, and a detailed description thereof will be omitted.

The receiving device of the fourth example embodiment, as with the receiving device of the first example embodiment, includes a plurality of ADCs 200, an SN ratio estimating means 201, a first recording means 202, a plurality of digital signal processing means 203, a switch means 204, a second recording means 205, and a combining means 206. The receiving device of the fourth example embodiment, as with the receiving device of the first example embodiment, also includes a scheduling means 209.

As to the receiving device in FIG. 8, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 8, as with the receiving device of the first example embodiment, a case where, as an example of the plurality of digital signal processing means 203, B digital signal processing means 203.1 to 203.B are included is illustrated.

The receiving device of the third example embodiment also includes a second combining means 800. The second combining means 800 is added between the digital signal processing means 203.1 to 203.B and the second recording means 205.

The second combining means 800 is a combining means that combines signals partly in order to reduce the amount of data to be written in the second recording means 205. For example, in the cases of time 3 and time 5 in FIG. 5, combined data of data 3_1, 3_2, 3_3, and 3_4 and combined data of data 5_1, 5_2, and 5_3 are recorded in the second recording means 205, respectively. More specifically, when, for example, assuming that three signals and combining weights are denoted by s_i and w_i, respectively, the three signals are combined by maximum ratio combining, data calculated by s1w1+w2s2+w3s3 is written in the second recording means 205.

At a point of time when all data given at a certain time have been obtained, the combining means 206 reads values into which the second combining means 800 combined a part of the data and performs addition of the other part of the data. For example, when data given at time 3 are combined at time 4 in FIG. 5, two sets of values, a set of values into which the data 3_1, 3_2, 3_3, and 3_4 are combined and a set of values into which data 3_5, 3_6, 3_7, and 3_8 are combined, are combined through addition.

The present example embodiment, as with the above-described first example embodiment, enables the number of the digital signal processing means 203 to be reduced. As a result of a reduction in the number of the digital signal processing means 203, circuit size of the whole system may be reduced.

Further, the present example embodiment enables capacity and throughput of the second recording means 205 to be reduced when compared with the first example embodiment.

Fifth Example Embodiment

Figure 9:
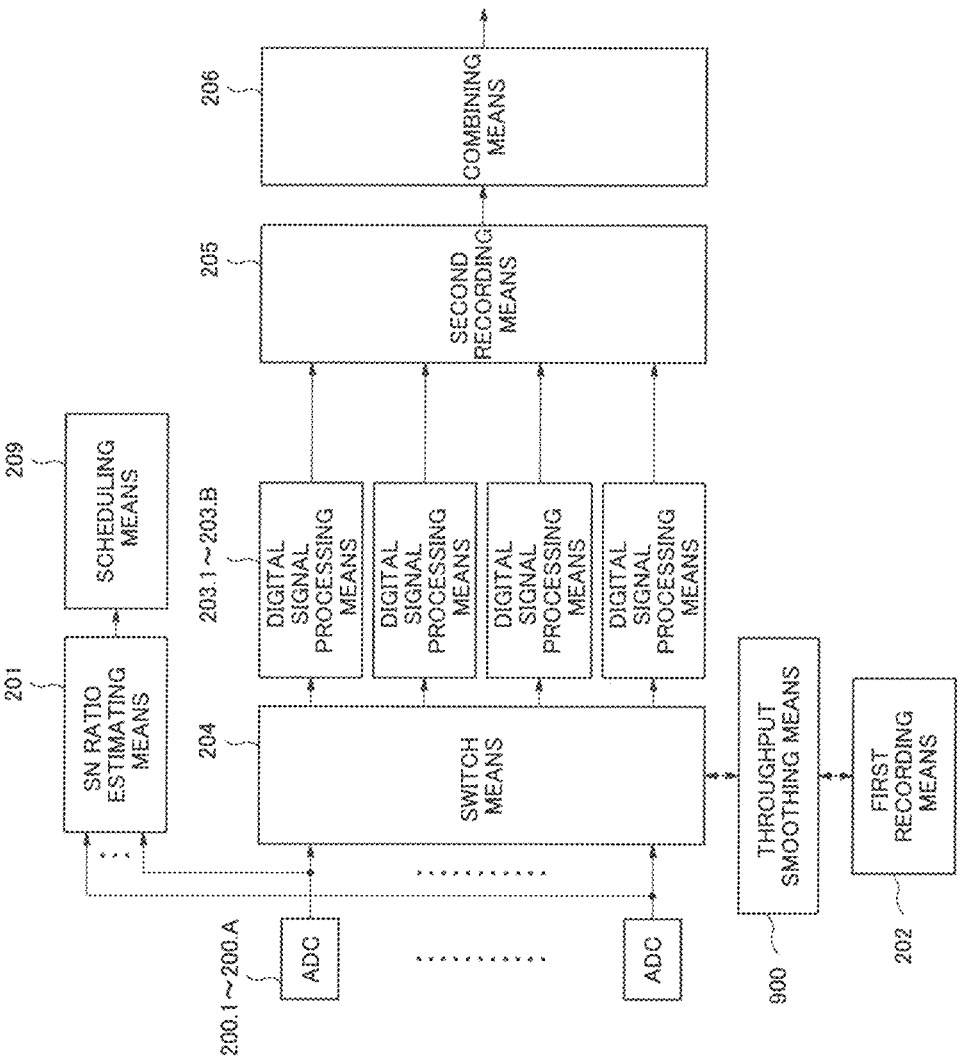
FIG. 9 is a block diagram illustrating a receiving device according to a fifth example embodiment.

Next, a receiving device according to a fifth example embodiment of the present invention will be described. The present example embodiment is an example embodiment relating to a configuration in which a buffer is interposed between a first recording means and a second recording means in order to reduce throughput. FIG. 9 is a block diagram illustrating the receiving device according to the fifth example embodiment of the present invention. The same reference numbers are assigned to the same components as those in the receiving device according to the first example embodiment, and a detailed description thereof will be omitted.

The receiving device of the fifth example embodiment, as with the receiving device of the first example embodiment, includes a plurality of ADCs 200, an SN ratio estimating means 201, a first recording means 202, a plurality of digital signal processing means 203, a switch means 204, a second recording means 205, and a combining means 206. The receiving device of the fifth example embodiment, as with the receiving device of the first example embodiment, also includes a scheduling means 209.

As to the receiving device in FIG. 9, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 9, as with the receiving device of the first example embodiment, a case where, as an example of the plurality of digital signal processing means 203, B digital signal processing means 203.1 to 203.B are included is illustrated.

The receiving device of the fifth example embodiment also includes a throughput smoothing means 900. The throughput smoothing means 900 is added between the first recording means 202 and the switch means 204.

The throughput smoothing means 900 is a means for smoothing writing speed into the first recording means 202. In the first example embodiment, writing throughput into the first recording means 202 is calculated as "a sampling rate of an ADC multiplied by resolution of an ADC multiplied by B", and a throughput of several hundreds of GB/sec is required depending on magnitude of A even in the case of a transmission capacity of 10 Gb. However, since a writing frequency into the first recording means 202 is at most approximately 10%, reducing throughput by use of this characteristic is a function of the throughput smoothing means 900.

The present example embodiment, as with the above-described first example embodiment, enables the number of the digital signal processing means 203 to be reduced. As a result of a reduction in the number of the digital signal processing means 203, circuit size of the whole system may be reduced.

Further, the present example embodiment enables writing throughput into the first recording means 202 to be reduced substantially when compared with the first example embodiment.

Sixth Example Embodiment

Figure 10:
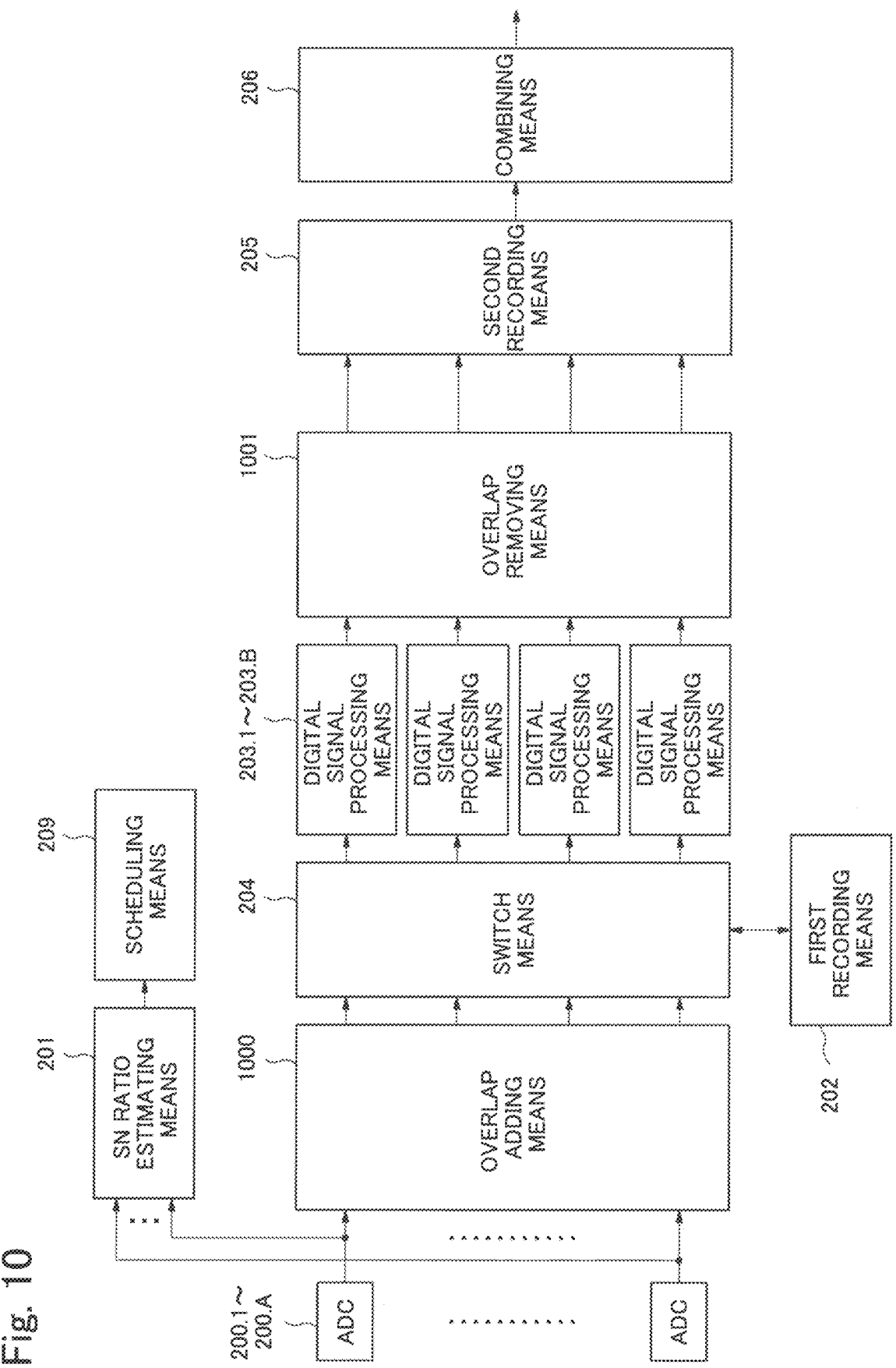
FIG. 10 is a block diagram illustrating a receiving device according to a sixth example embodiment.

Next, a receiving device according to a sixth example embodiment of the present invention will be described. FIG. 10 is a block diagram illustrating the receiving device according to the sixth example embodiment of the present invention. The same reference numbers are assigned to the same components as those in the receiving device according to the first example embodiment, and a detailed description thereof will be omitted.

The receiving device of the sixth example embodiment, as with the receiving device of the first example embodiment, includes a plurality of ADCs 200, an SN ratio estimating means 201, a first recording means 202, a plurality of digital signal processing means 203, a switch means 204, and a second recording means 205. The receiving device of the sixth example embodiment, as with the receiving device of the first example embodiment, also includes a combining means 206 and a scheduling means 209.

As to the receiving device in FIG. 10, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 10, as with the receiving device of the first example embodiment, a case where, as an example of the plurality of digital signal processing means 203, B digital signal processing means 203.1 to 203.B are included is illustrated.

The receiving device of the sixth example embodiment also includes an overlap adding means 1000 and an overlap removing means 1001. In other words, the sixth example embodiment is an embodiment in which the overlap adding means 1000 and the overlap removing means 1001 are added to the configuration of the first example embodiment.

Figure 11:
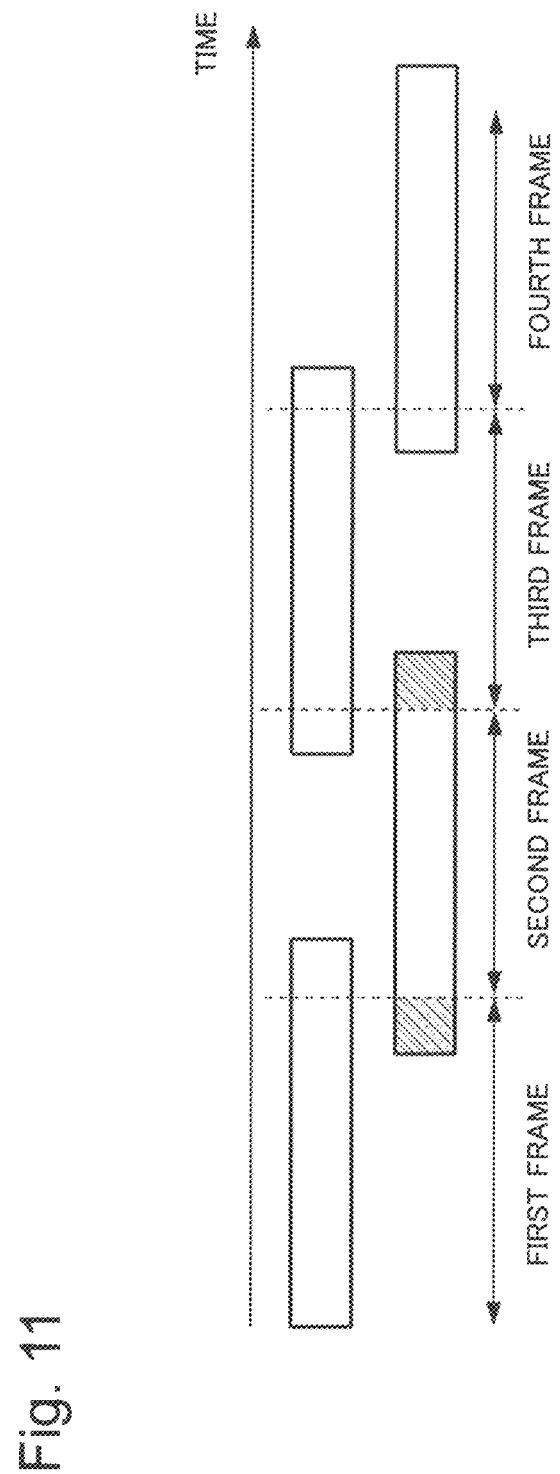
FIG. 11 is a diagram for a description of overlaps.

The overlap adding means 1000 is a means for adding data serving as overlapping portions to the front and back of each frame as illustrated in FIG. 11. More specifically, in the case of the second frame in FIG. 11, the overlap adding means 1000 is a means for adding data corresponding to time portions indicated in gray to the front and back of the second frame.

The overlap removing means 1001 is a means for, conversely to the overlap adding means 1000, removing data serving as overlapping portions that are added to the front and back of each frame. More specifically, in the case of the second frame in FIG. 11, the overlap removing means 1001 is a means for removing data corresponding to time portions indicated in gray that are added to the front and back of the second frame.

The present example embodiment, as with the above-described first example embodiment, enables the number of the digital signal processing means 203 to be reduced. As a result of a reduction in the number of the digital signal processing means 203, circuit size of the whole system may be reduced.

Although, in the above-described first example embodiment, for estimation of error at the head of each frame, data before the head of the frame cannot be used, in the present example embodiment, it is possible to estimate error at the head of each frame by use of data before the head of the frame. This configuration enables more algorithms to be employed for the digital signal processing means 203.1 to 203.B and better compensation to be performed.

Seventh Example Embodiment

Figure 12:
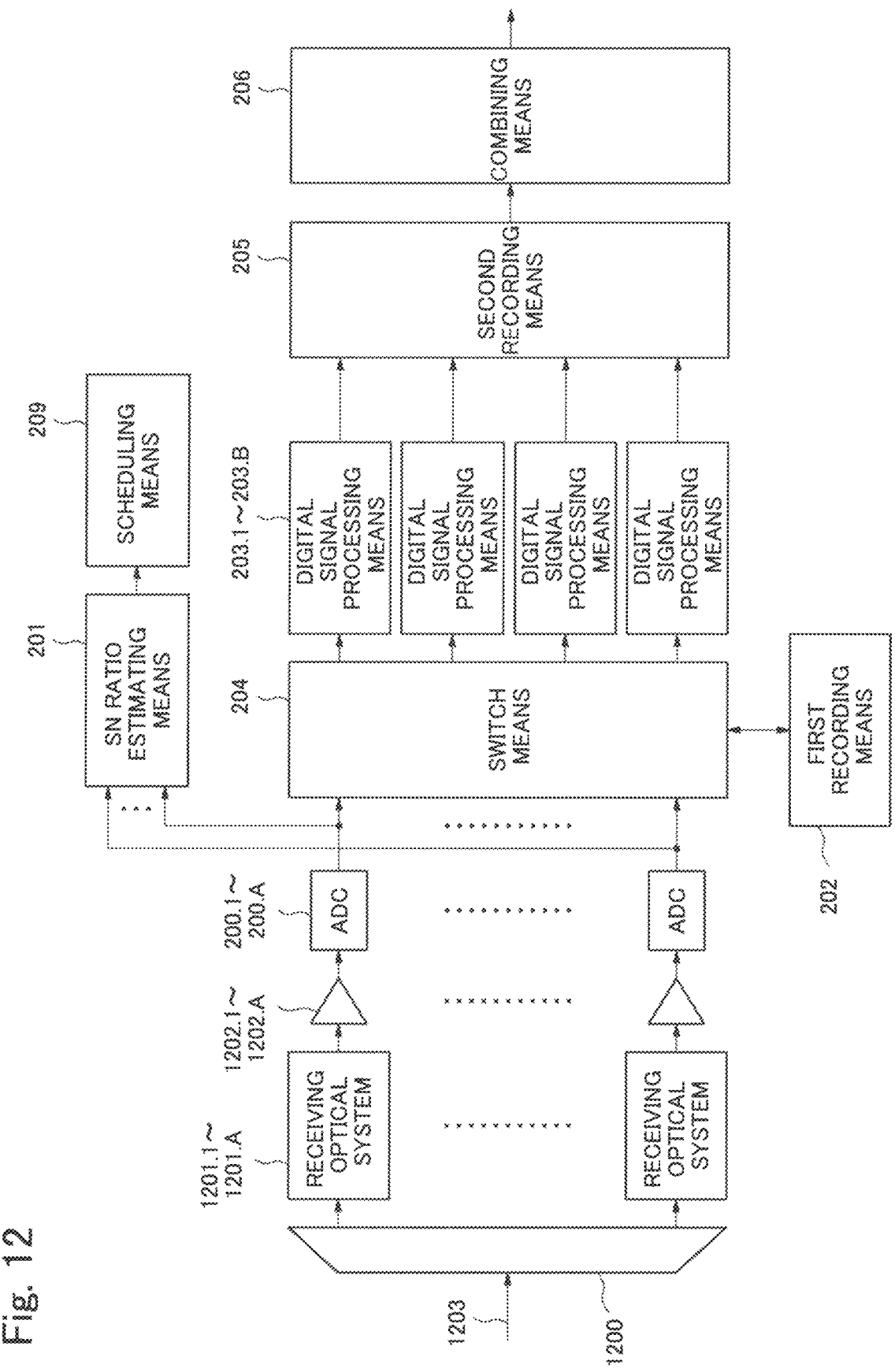
FIG. 12 is a block diagram illustrating a receiving device according to a seventh example embodiment.

Next, a receiving device according to a seventh example embodiment of the present invention will be described. The present example embodiment is an example embodiment relating to a receiving device embodied in a more concrete form. FIG. 12 is a block diagram illustrating the receiving device according to the seventh example embodiment of the present invention. The same reference numbers are assigned to the same components as those in the receiving device according to the first example embodiment, and a detailed description thereof will be omitted.

The receiving device of the seventh example embodiment, as with the receiving device of the first example embodiment, includes a plurality of ADCs 200, an SN ratio estimating means 201, a first recording means 202, a plurality of digital signal processing means 203, a switch means 204, and a second recording means 205. The receiving device of the seventh example embodiment, as with the receiving device of the first example embodiment, also includes a combining means 206 and a scheduling means 209.

As to the receiving device in FIG. 12, as with the receiving device of the first example embodiment, a case where, as an example of the plurality of ADCs 200, ADCs 200.1 to 200.A to which A analog signals are input and that output A digital signals are included is illustrated. Further, as to the receiving device in FIG. 12, as with the receiving device of the first example embodiment, a case where, as an example of the plurality of digital signal processing means 203, B digital signal processing means 203.1 to 203.B are included is illustrated.

The receiving device of the seventh example embodiment also includes a mode demultiplexer 1200, a plurality of receiving optical systems 1201, and a plurality of amplifiers 1202. In FIG. 12, a case where, as an example of the plurality of receiving optical systems 1201, A receiving optical systems 1201.1 to 1201.A are included is illustrated. In FIG. 12, a case where, as an example of the plurality of amplifiers 1202, A amplifiers 1202.1 to 1202.A are included is illustrated.

In other words, the seventh example embodiment is an example embodiment in which the mode demultiplexer 1200, such as one disclosed in PTL1, the receiving optical systems 1201.1 to 1201.A, and the amplifiers 1202.1 to 1202.A are added to the configuration of the first example embodiment.

The mode demultiplexer 1200 is a means for accepting output light from a multimode fiber 1203 as an input, demultiplexing the input light into A eigenmodes, and outputting signals in respective eigenmodes to single-mode fibers.

The receiving optical systems 1201.1 to 1201.A are optical systems, such as a delay interferometer and a 90 degree hybrid, that are tailored to respective modulation methods. The amplifiers 1202.1 to 1202.A are amplifiers that amplify electric values output from the receiving optical systems 1201.1 to 1201.A in such a way as to utilize the performance of the ADCs 200.1 to 200.A to the maximum extent possible.

The present example embodiment, as with the above-described first example embodiment, enables the number of the digital signal processing means 203 to be reduced. As a result of a reduction in the number of the digital signal processing means 203, circuit size of the whole system may be reduced.

Further, the present example embodiment has an advantageous effect that, without increasing circuit size for digital signal processing by as many as the number of eigenmodes, the same level of error rate may be achieved.

The present invention was described above through example embodiments thereof, but the present invention is not limited to the above example embodiments. For example, each of the above-described example embodiments may also be configured by combining the features of the example embodiment with a receiving device according to another example embodiment. For example, configuring a receiving device by combining the second combining means 800 of the fourth example embodiment with a receiving device of any of the second example embodiment, the third example embodiment, and the fifth to seventh example embodiments is conceivable. In addition, configuring a receiving device by combining the throughput smoothing means 900 of the fifth example embodiment with a receiving device of any of the second to fourth example embodiments, the sixth example embodiment, and the seventh example embodiment is conceivable.

A receiving device of the present invention is used for a receiving device that receives a transmitted signal by use of a plurality of receivers and performs decoding processing by combining a plurality of received signals. In particular, the receiving device of the present invention is used for free-space optical communication in which communication is performed by propagating laser light through the air. In addition, the technology is also applicable to optical fiber communication and wireless communication. Various modifications may be made within the scope of the present invention described in the claims, and it is needless to say that such modifications are also included in the scope of the present invention.

Other Example Embodiments

Each of the above-described receiving devices for free-space optical communication may also be achieved by an information processing device capable of executing a program that achieves the above-described operations. The program may be distributed in a form of a computer-readable recording medium. Reading the program recorded in such a recording medium and executing the program in the information processing device also enables each of receiving devices of the above-described example embodiments to be achieved in a software manner.

Figure 13A:
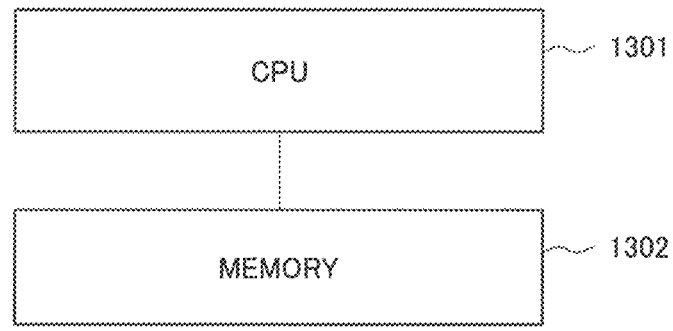
FIGS. 13A and 13B are a block diagram illustrating an information processing device for receiving devices according to other example embodiments and a block diagram illustrating a receiving device achieved by the information processing device in FIG. 13A, respectively.
Figure 13B:
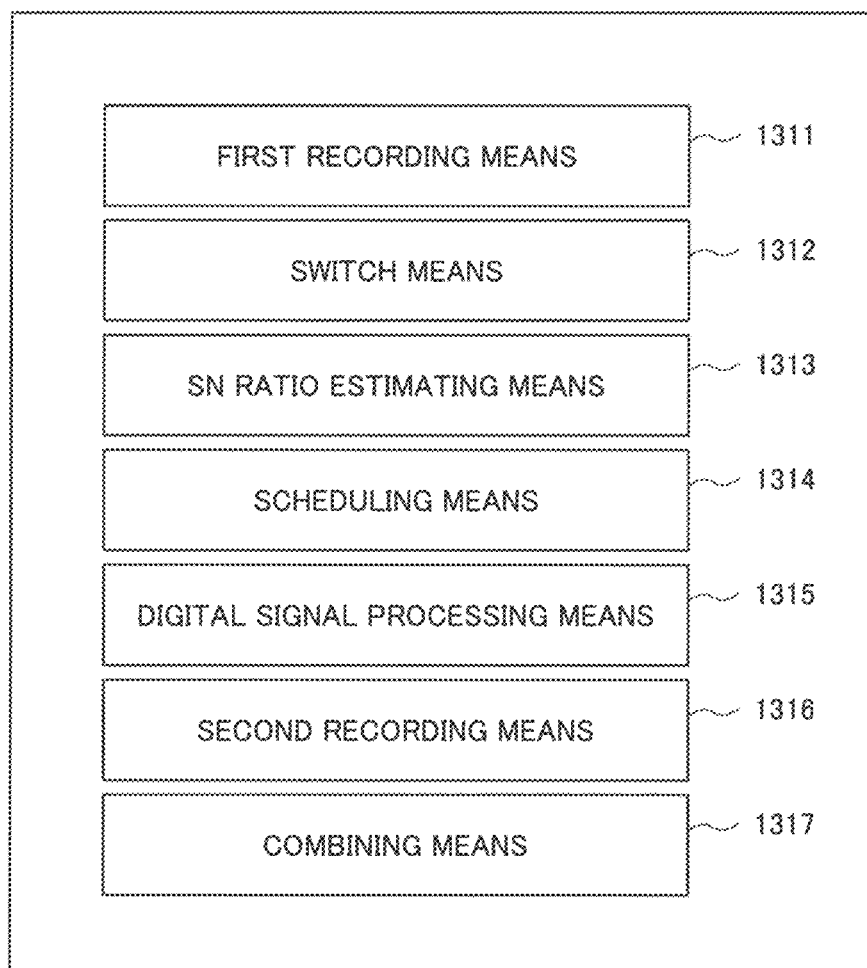
Figure 14:
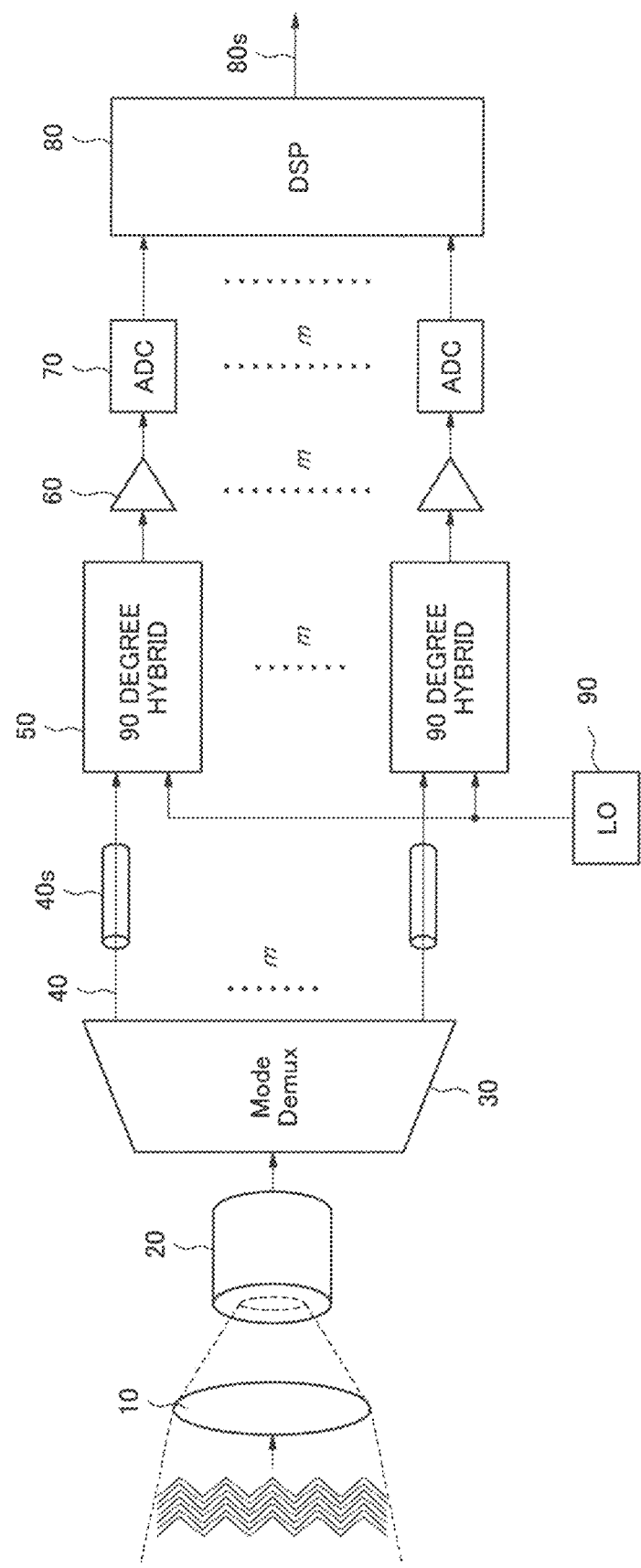
FIG. 14 is a block diagram illustrating an expected overall image of a receiving device for free-space optical communication (FSO) when the receiving device is configured by applying a method proposed in PTL1.

FIGS. 13A and 13B are a block diagram illustrating an information processing device for receiving devices according to other example embodiments of the present invention and a block diagram illustrating a receiving device achieved by the information processing device in FIG. 13A, respectively. The information processing device in FIG. 13A includes a Central Processing Unit (CPU) 1301 and a memory 1302 that is configured with a Random Access Memory (RAM) and the like.

By use of an information processing device having such a hardware configuration, all or a portion of a first recording means 1311, a switch means 1312, an SN ratio estimating means 1313, a schedule means 1314, and a digital signal processing means 1315 in FIG. 13B may be achieved. By use of the information processing device having such a hardware configuration, all or a portion of a second recording means 1316 and a combining means 1317 in FIG. 13B may also be achieved. Making the information processing device in FIG. 13A read and execute a control program of a receiving device also enables each of receiving devices of the example embodiments of the present invention to be achieved.

In addition, the control program for a receiving device may be distributed in a form of a recording medium recording the program. The program may be distributed in a form of a general-purpose semiconductor recording device, such as a Compact Flash (Registered Trademark) (CF) and a Secure Digital (SD), a magnetic recording medium, such as a flexible disk, an optical recording medium, such as a Compact Disc Read Only Memory (CD-ROM), or the like.

Summary of Solution to Problem

A data receiving device that decodes one stream of data from a plurality of input signals, the data receiving device including:
at least two or more digital signal processing means for performing signal processing on the plurality of input signals;
a first recording means for recording the plurality of input signals temporarily;
a switch means for supplying the digital signal processing means with the plurality of input signals and/or a set(s) of values recorded in the first recording means;
an SN ratio estimating means for estimating an S/N ratio of each of the plurality of input signals and determining the number of the input signals to be combined and a signal(s) to be combined;
a second recording means for recording a set of values output from each of the digital signal processing means temporarily;
a combining means for performing combining by use of a plurality of sets of data recorded in the second recording means; and
a scheduling means for performing control of all the means, based on a result from the SN ratio estimating means, wherein the scheduling means performs control in such a way that,
when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal(s) that the SN ratio estimating means determines to combine is/are recorded in the first recording means, and,
when the number of the input signals recorded in the first recording means is less than the number of the digital signal processing means, the digital signal processing means process a signal(s) recorded in the first recording means and the input signal(s), and, when the number of the input signals to be processed by the digital signal processing means is less than the number of signals to be combined that is determined by the SN ratio estimating means, only a signal(s) that is/are not processed by the digital signal processing means out of a signal(s) that the SN ratio estimating means determines to combine is/are recorded in the first recording means.

Summary of Advantageous Effects of Example Embodiments

A first advantageous effect of the example embodiments of the present invention is that circuit size of digital signal processing means (DSP) may be reduced.

This is because a scheduling means performs control in such a way that: when the number of input signals recorded in a first recording means is greater than or equal to the number of digital signal processing means, the digital signal processing means perform processing of the input signals in the order of time at which the input signals were recorded in the first recording means and, out of input signals at the time of the processing, a signal(s) that an SN ratio estimating means determines to combine is/are recorded in the first recording means; and, when the number of input signals recorded in the first recording means is less than the number of the digital signal processing means, the digital signal processing means process a signal(s) recorded in the first recording means and an input signal(s), and, when the number of input signals to be processed by the digital signal processing means is less than the number of signals to be combined that is determined by the SN ratio estimating means, only a signal(s) that is/are not processed by the digital signal processing means out of a signal(s) that the SN ratio estimating means determines to combine is/are recorded in the first recording means.

Performing control in this manner enables the number of required digital signal processing means to be set at the average number of digital signal processing means required for stabilizing communication, which enables the number of digital signal processing means to be reduced.

A second advantageous effect of the example embodiments of the present invention is, although being a secondary effect of the first advantageous effect, that power consumption may be reduced, a chip yield rate may be improved, and the like.

All or part of the example embodiments described above may be described as in the following supplementary notes, but the present invention is not limited thereto.

(Supplementary Note 1) A data receiving device that decodes one stream of data from a plurality of input signals, the data receiving device including:

at least two or more digital signal processing means for performing signal processing on the plurality of input signals;

a first recording means for recording the plurality of input signals temporarily;

a switch means for supplying the digital signal processing means with the plurality of input signals and/or a set(s) of values recorded in the first recording means;

an SN ratio estimating means for estimating an S/N ratio of each of the plurality of input signals and determining the number of the input signals to be combined and a signal(s) to be combined;

a second recording means for recording a set of values output from each of the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way as to cause, when the number of the input signals recorded in the first recording means is greater than or equal to the number of the digital signal processing means, the digital signal processing means to perform processing of the input signals in the order of time at which the input signals were recorded in the first recording means and, out of the input signals at the time of the processing, a signal(s) that the SN ratio estimating means determines to combine to be recorded in the first recording means, and, when the number of the input signals recorded in the first recording means is less than the number of the digital signal processing means, the digital signal processing means to process a signal(s) recorded in the first recording means and the input signal(s) and, when the number of the input signals to be processed by the digital signal processing means is less than the number of signals to be combined that is determined by the SN ratio estimating means, only a signal(s) that is/are not processed by the digital signal processing means out of a signal(s) that the SN ratio estimating means determines to combine to be recorded in the first recording means.

(Supplementary Note 2) The data receiving device according to supplementary note 1, receiving a plurality of analog signals and including:

an analog to digital converting means for generating the data signals from the plurality of analog signals; and a monitoring means for monitoring reception intensities of the analog signals, wherein the SN ratio estimating means estimates S/N ratios, based on values acquired from the monitoring means.

(Supplementary Note 3) The data receiving device according to supplementary note 1, receiving a plurality of analog signals and including:

an amplifying means for amplifying the plurality of analog signals; and an analog to digital converting means for generating the data signals from signals output from the amplifying means, wherein the SN ratio estimating means estimates S/N ratios, based on amplification factors of the amplifying means.

(Supplementary Note 4) The data receiving device according to any one of supplementary notes 1 to 3 further including, between the digital signal processing means and the second recording means, a second combining means.

(Supplementary Note 5) The data receiving device according to any one of supplementary notes 1 to 4 further including, between the switch means and the first recording means, a throughput smoothing means for smoothing throughput.

(Supplementary Note 6) The data receiving device according to any one of supplementary notes 1 to 5 further including:

an overlap adding means for intentionally making the sets of data overlap each other; and an overlap removing means for removing overlapping portions that the overlap adding means added.

(Supplementary Note 7) The data receiving device according to any one of supplementary notes 1 to 6, wherein, when an error rate less than or equal to a predetermined error rate cannot be achieved even when the plurality of input signals are combined, the SN ratio estimating means operates in such a way as not to process the data.

(Supplementary Note 8) A receiving device for free-space optical communication including:

a data receiving device according to any one of supplementary notes 1 to 7;

a mode demultiplexer; and a plurality of receiving optical systems that provide the data receiving device with the plurality of input signals.

(Supplementary Note 9) A control method of a data receiving device that decodes one stream of data from a plurality of input signals, the data receiving device including:

a first recording means for recording a plurality of input signals temporarily;

an SN ratio estimating means for estimating an S/N ratio of each of the plurality of input signals and determining the number of the input signals to be combined and a signal(s) to be combined;

at least two or more digital signal processing means for performing signal processing on the plurality of input signals;

a switch means for supplying the digital signal processing means with the plurality of input signals and/or a set(s) of values recorded in the first recording means;

a second recording means for recording data output from the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal(s) that the SN ratio estimating means determines to combine is/are recorded in the first recording means, and, when the number of the input signals recorded in the first recording means is less than the number of the digital signal processing means, the digital signal processing means process a signal(s) recorded in the first recording means and the input signal(s), and, when the number of the input signals to be processed by the digital signal processing means is less than the number of signals to be combined that is determined by the SN ratio estimating means, only a signal(s) that is/are not processed by the digital signal processing means out of a signal(s) that the SN ratio estimating means determines to combine is/are recorded in the first recording means.

(Supplementary Note 10) The control method of the data receiving device according to supplementary note 9 including:

receiving a plurality of analog signals;

generating the data signals from the plurality of analog signals; and monitoring reception intensities of the analog signals, wherein the SN ratio estimating means estimates S/N ratios, based on results of monitoring of reception intensities of the analog signals.

(Supplementary Note 11) The control method of the data receiving device according to supplementary note 9 including:

receiving a plurality of analog signals;

amplifying the plurality of analog signals; and generating the data signals from the plurality of amplified analog signals, wherein the SN ratio estimating means estimates S/N ratios, based on amplification factors of the plurality of analog signals.

(Supplementary Note 12) The control method of the data receiving device according to any one of supplementary notes 9 to 11, wherein operation is changed in such a way that the second recording means records only some of signals output from the digital signal processing means.

(Supplementary Note 13) The control method of the data receiving device according to any one of supplementary notes 9 to 12 including, between the switch means and the first recording means, smoothing throughput.

(Supplementary Note 14) The control method of the data receiving device according to any one of supplementary notes 9 to 13 including:

intentionally making the sets of data overlap each other, the sets of data being a plurality of input signals input to the switch means; and removing overlapping portions of the sets of data output from the digital signal processing means.

(Supplementary Note 15) The control method of the data receiving device according to any one of supplementary notes 9 to 14, wherein when an error rate less than or equal to a predetermined error rate cannot be achieved even when the plurality of input signals are combined, the SN ratio estimating means operates in such a way as not to process the data.

(Supplementary Note 16) A control program of a data receiving device that decodes one stream of data from a plurality of input signals, the control program making a computer function as:

at least two or more digital signal processing means for performing signal processing on the plurality of input signals;

a first recording means for recording the plurality of input signals temporarily;

a switch means for supplying the digital signal processing means with the plurality of input signals and/or a set(s) of values recorded in the first recording means;

an SN ratio estimating means for estimating an S/N ratio of each of the plurality of input signals and determining the number of the input signals to be combined and a signal(s) to be combined;

a second recording means for recording a set of values output from each of the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal(s) that the SN ratio estimating means determines to combine is/are recorded in the first recording means, and, when the number of the input signals recorded in the first recording means is less than the number of the digital signal processing means, the digital signal processing means process a signal(s) recorded in the first recording means and the input signal(s), and, when the number of the input signals to be processed by the digital signal processing means is less than the number of signals to be combined that is determined by the SN ratio estimating means, only a signal(s) that is/are not processed by the digital signal processing means out of a signal(s) that the SN ratio estimating means determines to combine is/are recorded in the first recording means.

(Supplementary Note 17) The control program of the data receiving device according to supplementary note 16, wherein the data receiving device receives a plurality of analog signals, the control program making the computer function as:

an analog to digital converting means for generating the data signals from the plurality of analog signals; and a monitoring means for monitoring reception intensities of the analog signals and making the SN ratio estimating means function in such a way as to estimate S/N ratios, based on values acquired from the monitoring means.

(Supplementary Note 18) The control program of the data receiving device according to supplementary note 16, wherein the data receiving device receives a plurality of analog signals, the control program making the computer function as:

an amplifying means for amplifying the plurality of analog signals; and an analog to digital converting means for generating the data signals from signals output from the amplifying means and making the SN ratio estimating means function in such a way as to estimate S/N ratios, based on amplification factors of the amplifying means.

(Supplementary Note 19) The control program of the data receiving device according to any one of supplementary notes 16 to 18 making the computer change operation in such a way that the second recording means records only some of signals output from the digital signal processing means.
(Supplementary Note 20) The control program of the data receiving device according to any one of supplementary notes 16 to 19
further making the computer function as
a throughput smoothing means for, between the switch means and the first recording means, smoothing throughput.
(Supplementary Note 21) The control program of the data receiving device according to any one of supplementary notes 16 to 20
further making the computer function as:
an overlap adding means for intentionally making the sets of data overlap each other; and
an overlap removing means for removing overlapping portions that the overlap adding means added.
(Supplementary Note 22) The control program of the data receiving device according to any one of supplementary notes 16 to 21
making the computer operate in such a way that
when an error rate less than or equal to a predetermined error rate cannot be achieved even when the plurality of input signals are combined, the SN ratio estimating means does not process the data.

The present invention was described above by use of the above-described example embodiments as exemplary examples. However, the present invention is not limited to the above-described example embodiments. That is, various modes that could be understood by a person skilled in the art may be applied to the present invention within the scope of the present invention.

REFERENCE SIGNS LIST

101, 201 SN ratio estimating means
102, 202 First recording means
103, 203, 203.1 to 203.B Digital signal processing means
104, 204 Switch means
105, 205 Second recording means
106, 206 Combining means
109, 209 Scheduling means
200, 200.1 to 200.A ADC
600 Monitoring means
700, 700.1 to 700.A Amplifying means
800 Second combining means
900 Throughput smoothing means
1000 Overlap adding means
1001 Overlap removing means
1200 Mode demultiplexer
1201, 1201.1 to 1201.A Receiving optical system
1202, 1202.1 to 1202.A Amplifier
1203 Multimode fiber
1301 CPU
1302 Memory

The invention claimed is:

1. A data receiving device that decodes one stream of data from a plurality of input signals, the data receiving device comprising:
at least two or more digital signal processing means that performs signal processing on the plurality of input signals;
a first recording means that records the plurality of input signals temporarily;
a switch means that supplies the digital signal processing means with the plurality of input signals or a value recorded in the first recording means;

an SN ratio estimating means that estimates a Signal to Noise (S/N) ratio of each of the plurality of input signals and determines the number of the input signals to be combined and a signal to be combined;
a second recording means that records a set of values output from each of the digital signal processing means temporarily;
a combining means that performs combining by use of a plurality of sets of data recorded in the second recording means; and
a scheduling means that performs overall control, based on a result from the SN ratio estimating means,
wherein the scheduling means performs control in such a way as to cause,
when the number of the input signals recorded in the first recording means is greater than or equal to the number of the digital signal processing means, the digital signal processing means to perform processing of the input signals in the order of time at which the input signals were recorded in the first recording means and, out of the input signals at the time of the processing, a signal that the SN ratio estimating means determines to combine to be recorded in the first recording means, and,
when the number of the input signals recorded in the first recording means is less than the number of the digital signal processing means, the digital signal processing means to process a signal recorded in the first recording means and the input signal and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine to be recorded in the first recording means.

2. The data receiving device according to claim 1
receiving a plurality of analog signals and
comprising:
an analog to digital converting means that generates the data signals from the plurality of analog signals; and
a monitoring means that monitors reception intensities of the analog signals,
wherein the SN ratio estimating means estimates S/N ratios, based on values acquired from the monitoring means.

3. The data receiving device according to claim 1
receiving a plurality of analog signals and
comprising:
an amplifying means that amplifies the plurality of analog signals; and
an analog to digital converting means that converts the data signals from signals output from the amplifying means,
wherein the SN ratio estimating means estimates S/N ratios, based on amplification factors of the amplifying means.

4. The data receiving device according to claim 1 further comprising,
between the digital signal processing means and the second recording means, a second combining means.

5. The data receiving device according to claim 1 further comprising,
between the switch means and the first recording means, a throughput smoothing means that smoothies throughput.

6. The data receiving device according to claim 1 further comprising:

an overlap adding means that intentionally makes the sets of data overlap each other; and an overlap removing means that removes overlapping portions that the overlap adding means added.

7. The data receiving device according to claim 1, wherein, when an error rate less than or equal to a predetermined error rate cannot be achieved even when the plurality of input signals are combined, the SN ratio estimating means operates in such a way as not to process the data.

8. A receiving device for free-space optical communication comprising:

a data receiving device according to claim 1;
a mode demultiplexer; and
a plurality of receiving optical systems that provide the data receiving device with the plurality of input signals.

9. A control method of a data receiving device that decodes one stream of data from a plurality of input signals, the data receiving device comprising:

a first recording means that records a plurality of input signals temporarily;

an SN ratio estimating means that estimates a Signal to Noise (S/N) ratio of each of the plurality of input signals and determines the number of the input signals to be combined and a signal to be combined;

at least two or more digital signal processing means that performs signal processing on the plurality of input signals;

a switch means that supplies the digital signal processing means with the plurality of input signals or a value recorded in the first recording means;

a second recording means that records data output from the digital signal processing means temporarily;

a combining means that performs combining by use of a plurality of sets of data recorded in the second recording means; and a scheduling means that performs overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal that the SN ratio estimating means determines to combine is recorded in the first recording means, and, when the number of the input signals recorded in the first recording means is less than the number of the digital signal processing means, the digital signal processing means process a signal recorded in the first recording means and the input signal, and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine is recorded in the first recording means.

10. The control method of the data receiving device according to claim 9 comprising:

receiving a plurality of analog signals;
generating the data signals from the plurality of analog signals; and
monitoring reception intensities of the analog signals, wherein the SN ratio estimating means estimates S/N ratios, based on results of monitoring of reception intensities of the analog signals.

11. The control method of the data receiving device according to claim 9 comprising:

receiving a plurality of analog signals;
amplifying the plurality of analog signals; and
generating the data signals from the plurality of amplified analog signals, wherein the SN ratio estimating means estimates S/N ratios, based on amplification factors of the plurality of analog signals.

12. The control method of the data receiving device according to claim 9, wherein operation is changed in such a way that the second recording means records only some of signals output from the digital signal processing means.

13. The control method of the data receiving device according to claim 9 comprising, between the switch means and the first recording means, smoothing throughput.

14. The control method of the data receiving device according to claim 9 comprising:

intentionally making the sets of data overlap each other, the sets of data being a plurality of input signals input to the switch means; and removing overlapping portions of the sets of data output from the digital signal processing means.

15. The control method of the data receiving device according to claim 9, wherein when an error rate less than or equal to a predetermined error rate cannot be achieved even when the plurality of input signals are combined, the SN ratio estimating means operates in such a way as not to process the data.

16. A non-transitory computer-readable medium containing a control program of a data receiving device that decodes one stream of data from a plurality of input signals, the control program making a computer function as:

at least two or more digital signal processing means for performing signal processing on the plurality of input signals;

a first recording means for recording the plurality of input signals temporarily;

a switch means for supplying the digital signal processing means with the plurality of input signals or a value recorded in the first recording means;

an SN ratio estimating means for estimating a Signal to Noise (S/N) ratio of each of the plurality of input signals and determining the number of the input signals to be combined and a signal to be combined;

a second recording means for recording a set of values output from each of the digital signal processing means temporarily;

a combining means for performing combining by use of a plurality of sets of data recorded in the second recording means; and a scheduling means for performing overall control, based on a result from the SN ratio estimating means, wherein the scheduling means performs control in such a way that when the number of the input signals recorded in the first recording means is greater than or equal to the number of the digital signal processing means, the digital signal processing means perform processing of the input signals in the order of time at which the input signals were recorded in the first recording means and, out of the input signals at the time of the processing, a signal that the SN ratio estimating means determines to combine is/are recorded in the first recording means, and, when the number of the input signals recorded in the first recording means is less than the number of the digital signal processing means, the digital signal processing means process a signal recorded in the first recording means and the input signal, and, when the number of the input signals to be processed by the digital signal processing means is less than the number of signals to be combined that is determined by the SN ratio estimating means, only a signal that is not processed by the digital signal processing means out of a signal that the SN ratio estimating means determines to combine is recorded in the first recording means.

17. The non-transitory computer-readable medium containing a control program of the data receiving device according to claim 16,
wherein the data receiving device receives a plurality of analog signals,
the control program making the computer function as:
an analog to digital converting means for generating the data signals from the plurality of analog signals; and
a monitoring means for monitoring reception intensities of the analog signals and making the SN ratio estimating means function in such a way as to estimate S/N ratios, based on values acquired from the monitoring means.

18. The non-transitory computer-readable medium containing a control program of the data receiving device according to claim 16,
wherein the data receiving device receives a plurality of analog signals,
the control program making the computer function as:
an amplifying means for amplifying the plurality of analog signals; and
an analog to digital converting means for generating the data signals from signals output from the amplifying means and making the SN ratio estimating means function in such a way as to estimate S/N ratios, based on amplification factors of the amplifying means.

19. The non-transitory computer-readable medium containing a control program of the data receiving device according to claim 16
making the computer change operation in such a way that the second recording means records only some of signals output from the digital signal processing means.

20. The non-transitory computer-readable medium containing a control program of the data receiving device according to claim 16
further making the computer function as
a throughput smoothing means for, between the switch means and the first recording means, smoothing throughput.

* * * * *